United States Patent [19]
Ayukawa et al.

[11] Patent Number: 6,158,009
[45] Date of Patent: Dec. 5, 2000

[54] COMMUNICATION MONITORING AND CONTROLLING APPARATUS

[75] Inventors: Ichiro Ayukawa; Yuji Shiraishi; Yoshiko Koizumi; Kazutoshi Kawamura; Kimio Watanabe, all of Kawasaki, Japan

[73] Assignee: Fujitsu Limited, Kawasaki, Japan

[21] Appl. No.: 09/065,797

[22] Filed: Apr. 23, 1998

[30] Foreign Application Priority Data

Oct. 17, 1997 [JP] Japan ..................... 9-284819

[51] Int. Cl.⁷ ................. H02H 3/05; H04L 1/22
[52] U.S. Cl. .............. 713/201; 709/229; 709/224
[58] Field of Search ............. 713/201; 709/229, 709/224, 225

[56] References Cited

U.S. PATENT DOCUMENTS

| | | | |
|---|---|---|---|
| 4,897,874 | 1/1990 | Lidinsky et al. | 380/3 |
| 5,109,515 | 4/1992 | Laggis et al. | 395/725 |
| 5,257,369 | 10/1993 | Skeen et al. | 395/650 |
| 5,832,228 | 11/1998 | Holden et al. | 395/200.55 |

FOREIGN PATENT DOCUMENTS

| | | |
|---|---|---|
| 63-263858 | 10/1988 | Japan . |
| 3-175562 | 7/1991 | Japan . |
| 5-108687 | 4/1993 | Japan . |

*Primary Examiner*—Dieu-Minh T. Le
*Attorney, Agent, or Firm*—Helfgott & Karas, PC.

[57] ABSTRACT

A communication monitoring and controlling apparatus for easily collecting monitoring information is connected to an existing network composed of a plurality of communication equipment. A management information collecting unit collects management information of each of the communication equipment. The management information is in an existing network management information format. A format converting unit converts the management information in the existing network management information format into management information in a new-type network management information format. The new-type network management information format is a format used by the new-type network, and handles the existing network composed of the communication equipments as one network element. The converted management information is transmitted to at least one operation system of the new-type network by a transmitting unit.

11 Claims, 22 Drawing Sheets

COMMUNICATION MONITORING AND CONTROLLING APPARATUS

BACKGROUND OF THE INVENTION (1) Field of the Invention

The present invention relates to a communication monitoring and controlling apparatus, and more particularly to a communication monitoring and controlling apparatus in an existing network of communication equipment which is connected to a new-type network which comprises a plurality of network elements and an operation system.

(2) Description of the Related Art

New-type networks may be SDH (Synchronous Digital Hierarchy) communication networks, for example, and existing networks may be PDH (Presiochronous Digital Hierarchy) communication networks, for example.

The existing PDH communication networks have been associated with a monitoring and controlling system using local interfaces and protocols. For SDH communication networks newly recommended by ITU-T (International Telecommunication Union-Telecommunication Sector), there has been recommended a standardized monitoring and controlling system. In view of the standardized monitoring and controlling system recommended for SDH communication networks, there have been growing demands for combining a conventional local PDH communication network monitoring and controlling system with the standardized monitoring and controlling system, for monitoring the existing PDH communication networks. Various efforts have been made in the art to meet such demands.

In communities where communication networks are to be newly introduced, such as those in developing countries, a transmission rate of 150 Mbps used by SDH communication networks is too high for communities including towns and villages where the population is relatively small, regardless of the fact that SDH communication networks will be a mainstream standard system in the future. Accordingly, those regions have seen the need for PDH communication network systems which use low and medium transmission rates of 2 Mbps×4 communication links, 2 Mbps×16 communication links, and 34 Mbps×1 communication link and entail a relatively low facility cost.

However, although PDH communication network systems play a major role in signal transmission for a while in such small-scale communities in developing countries, such developing countries naturally have plans to introduce an SDH communication network between large cities to interconnect the PDH communication networks in the near future.

In view of such plans, it is necessary to introduce PDH communication networks with their monitoring and controlling system designed in conformity with a standardized SDH monitoring system, so that an SDH communication network which will be introduced in the near future can be monitored in an integrated fashion by a standardized monitoring and controlling system without any special modifications or additions.

The present invention is not concerned with a process for integrating an existing PDH communication network monitoring and control system with an SDH communication network monitoring and control system, but with the provision of a PDH communication network monitoring and control system, which can newly be installed, taking into account a possible combination in the future with an SDH communication network monitoring and control system for an integrated network monitoring capability.

A first conventional arrangement will be described below.

FIG. 21 of the accompanying drawings shows a conventional PDH/SDH converting apparatus which is designed to integrate an existing PDH monitoring and controlling system with an SDH communication network monitoring and control system.

As shown in FIG. 21, an SDH communication network comprises a plurality of network elements (hereinafter referred to as "NE") 101–105 and an operation system 106, and a PDH communication network comprises PDH units 107–109. The PDH communication network has standard communication converters 110–112 associated respectively with the PDH units 107–109 and positioned in a region where the PDH communication network is held in contact with the SDH communication network. The standard communication converters 110–112 are capable of converting monitoring and controlling information according to local interface specifications of the PDH communication network into monitoring and controlling information according to standard interface specifications of the SDH communication network, and vice versa. With these capabilities of the standard communication converters 110–112, the PDH units 107–109 may be seen as respective NEs when viewed from the operation system 106, and can be handled as equivalents to NEs of the SDH communication network.

The standard communication converters 110–112 are combined with the PDH unit 107, and they jointly serve as a PDH/SDH converting apparatus 113.

A second conventional arrangement will be described below.

FIG. 22 of the accompanying drawings shows the conventional communication system shown in FIG. 21, as viewed from a different viewpoint. In FIG. 22, the operation system 106 shown in FIG. 21 is referred to as a host system 114, the PDH/SDH converting apparatus 113 as a master office 115, and the PDH unit 108 as a slave office 116. NEs 117, 118 are connected to the master office 115, and the host system 114 is directly connected to the master office 115 though the host system 114 may be connected to any one of the NEs of the SDH communication network without any change in its functions. While only one slave office 116 is shown in FIG. 22, there are actually a plurality of slave offices in the PDH communication network.

When the host system 114 is to read setting information of the slave office 116, the host system 114 transmits a reading request, which is received by a host interface 115a of the master office 115. The host interface 115a has the functions of the standard communication converters 110–112 shown in FIG. 21. The received reading request is converted into local interface specifications by the host interface 115a, and then transferred from an interoffice communication unit 115b to an interoffice communication unit 116a of the slave office 116, from which the reading request is sent to a setting change processor 116b. In response to the reading request from the setting change processor 116b, setting information is read from a setting storage unit 116c and sent to the interoffice communication unit 116a. The setting information is then transmitted from the interoffice communication unit 116a through the interoffice communication unit 115b and the host interface 115a to the host system 114.

A third conventional arrangement will be described below.

In FIG. 22, the operator accesses (logs in) each of the NEs via the host system 114. The monitoring and controlling system of the SDH communication network incorporates a security function for preventing an unauthorized person from operating the host system 114 in an attempt to change settings and control the NEs for protection against communication system failures.

Specifically, identification names (user names), passwords, and security levels of the operators who are allowed to access the NEs are registered in the NEs. When an access request is sent from the host system 114 to an NE, the access request is accompanied by the user name and password of the operator. If the user name and the password are registered in the NE, then the NE permits the operator to operate the NE at the corresponding security level registered in the NE.

Local terminals for changing settings are connected to the respective slave offices. A local terminal for changing settings is also connected to the master office 115 because the master office 115 has functions as a slave office. These local terminals register identification names (user names) and security levels of the operators who are allowed to operate the local terminals. Therefore, only authorized persons or operators are allowed to operate the local terminals.

According to the first conventional arrangement, in order for the operation system 106 to obtain monitoring information from the PDH units 107–109, it is necessary for the operation system 106 to log in or be associated with the PDH units 107–109. However, since the PDH communication network, which is of a low or medium transmission rate, has a relatively small amount of monitoring information, such a logging-in or associating process is rather tedious and time-consuming.

Each of the standard communication converters 110–112 requires a large-capacity storage unit and a complex logic circuit, and as many standard communication converters 110–112 as the number of PDH units 107–109 are needed. Therefore, the overall PDH communication network is excessively large in hardware and software scale.

According to the second conventional arrangement, the host system 114 is usually operated by a human operator, and the networks are required to send a quick response in reply to a request made by such a human operator. When the host system 114 is to read setting information of the slave office 116, a reading request is sent from the host system 114 through the master office 115 to the slave office 116, and a response is sent from the slave office 116 through the master office 115 to the host system 114. Therefore, if there are many slave offices, then a relatively long period of time is needed until the host system 114 receives responses from all the slave offices after having transmitted a reading request.

Generally, it is necessary for the host system 114 and the slave offices to have the same monitoring information, the same controlling information, and the same setting information. No problem arises insofar as settings are established in the slave offices and the slave offices are controlled by the host system 114. However, when settings are changed directly by slave offices, the setting information in the host system 114 becomes different from the setting information in the slave offices. Therefore, the host system 114 has heretofore been required to send a reading request periodically to the slave offices in order to recognize any unknown changes in the settings, and update its own stored setting information based on responses received from the slave offices. Such a periodic setting information updating process is tedious and timeconsuming.

Furthermore, since different processes are needed to establish settings from the host system 114 and change settings locally from the slave offices, the processes carried out by the host system 114 and the slave offices are complicated.

For initializing setting information, it is necessary to transmit and receive initializing information between the host system 114, the master office 115, and the slave offices 116. The amount of communications required to transmit and receive such initializing information tends to reduce the efficiency of transfer of monitoring and controlling information.

According to the third conventional arrangement, the security function of the monitoring and controlling system of the SDH communication network has been sufficient if it does not cover the PDH communication network. However, if the monitoring and controlling system should cover the PDH communication network as well as the SDH communication network, then it is necessary to establish settings in, control, and monitor the PDH units (slave offices), and hence each of the slave offices needs a security function.

Once the networks are constructed, it is possible to access the individual slave offices from the host system 114 via the master office 115. However, when the slave offices are set up after they are delivered until the networks are constructed, each of the slave offices needs a function to allow itself to be directly logged in. Many instances in maintenance activities require individual slave offices to be locally logged in. Accordingly, not only the master offices, but also the individual slave offices, need a security function.

When an operator who is registered in a local terminal accesses a slave office connected to the local terminal via the local terminal, the operator can gain access to all the slave offices via the local terminal. It has been unable to establish security separately with respect to each of the slave offices.

SUMMARY OF THE INVENTION

It is therefore an object of the present invention to provide a communication monitoring and controlling apparatus which can easily collect monitoring information, has a reduced hardware scale, and minimizes an amount of software-processed information.

Another object of the present invention is to provide a communication monitoring and controlling apparatus which is designed to increase the monitoring and controlling capability of a host system.

Still another object of the present invention is to provide a communication monitoring and controlling apparatus which is designed to improve a security function.

To achieve the above objects, there is provided in accordance with an aspect of the present invention a communication monitoring and controlling apparatus in an existing network composed of a plurality of communication equipment and connected to a new-type network composed of a plurality of network elements and an operation system. The communication monitoring and controlling apparatus includes management information collecting units disposed in a first communication equipment of the existing network which is connected to the new-type network, for collecting management information of the communication equipment of the existing network, a format converting unit disposed in the first communication equipment, for converting an existing network management information format of the management information collected by the management information collecting unit into a new-type network management information format for accommodating management information of one network element, and a transmitting unit disposed in the first communication equipment, for transmitting management information outputted from the format converting unit to the operation system of the new-type network.

According to another aspect of the present invention, there is also provided a communication monitoring and controlling apparatus in an existing network composed of a plurality of communication equipment and connected to a new-type network composed of a plurality of network elements and an operation system. The communication monitoring and controlling apparatus includes a notice request transmitting unit disposed in a first communication equipment of the existing network which is connected to the new-type network, for transmitting a provide request to notice setting information to a second communication equipment, other than the first communication equipment, of the existing network, a request responding unit disposed in the second communication equipment, for transmitting setting information of the second communication equipment to the first communication equipment in response to the notice request transmitted from the notice request transmitting unit, a setting information holding unit disposed in the first communication equipment, for storing the setting information transmitted from the request responding means, and a noticing unit disposed in the first communication equipment, for reading the setting information from the setting information holding unit and noticing the setting information to the operation system in response to a reading request from the operation system.

According to still another aspect of the present invention, there is further provided a communication monitoring and controlling apparatus in an existing network composed of a plurality of communication equipment and a plurality of local terminals connected respectively thereto, and connected to a new-type network composed of a plurality of network elements and an operation system. The communication monitoring and controlling apparatus includes first user identification information storing unit disposed in a first communication equipment of the existing network which is connected to the new-type network, for storing user identification information of a user who is allowed to access the existing network through the operation system, second user identification information storing unit disposed in each of the communication equipment of the existing network, for storing transferred user identification information which is the same as the user identification information stored in the first user identification information storing means, and changing unit disposed in the first communication equipment and responsive to a change in the user identification information stored in the first user identification information storing means, for making the same change in the user identification information stored in the second user identification information as the change in the user identification information stored in the first user identification information storing unit.

The above and other objects, features, and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
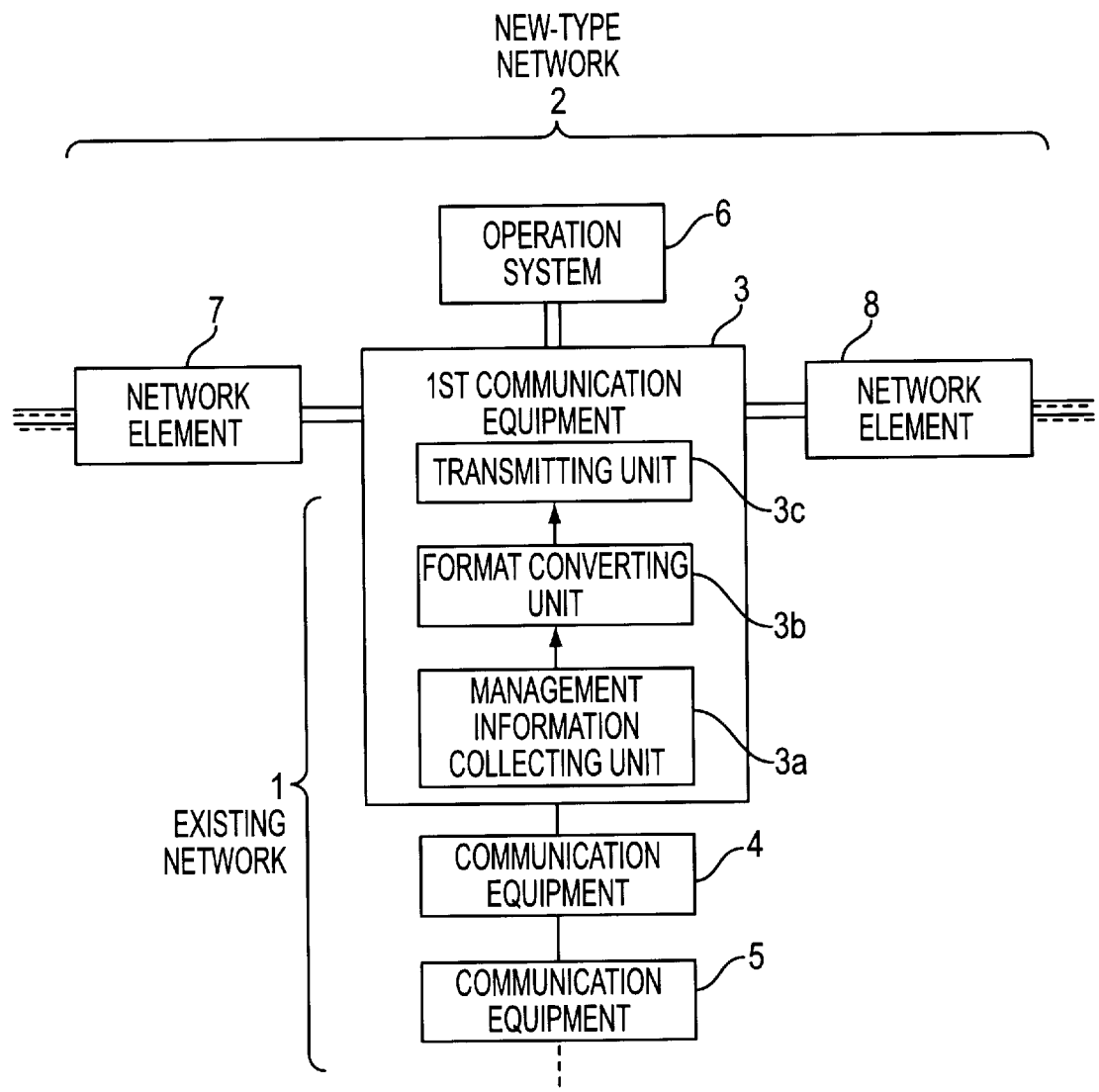
FIG. 1 is a block diagram illustrative of the principles of a communication monitoring and controlling apparatus according to a first embodiment of the present invention.

The principles of a communication monitoring and controlling apparatus according to a first embodiment of the present invention will first be described below with reference to FIG. 1. As shown in FIG. 1 the communication monitoring and controlling apparatus according to the first embodiment is connected to an existing network 1 comprising a plurality of first, second, and third communication equipment 3, 4, 5. The existing network 1 is connected to a new-type network 2 comprising a plurality of network elements 7, 8 and at least one operation system 6.

The communication monitoring and controlling apparatus is disposed in the first communication equipment 3 connected to the new-type network 2, and comprises a management information collecting unit 3*a* disposed in the first communication equipment 3, for collecting management information of the communication equipment 3–5, a format converting unit 3*b* disposed in the first communication equipment 3, for converting an existing network management information format of the management information collected by the management information collecting unit 3*a* into a new-type network management information format for accommodating management information of one network element, and a transmitting unit 3*c* disposed in the first communication equipment 3, for transmitting management information outputted from the format converting unit 3*b* to the at least one operation system 6 of the new-type network 2.

In the first communication equipment 3, the management information collecting unit 3*a* collects management information of the communication equipment 3–5. The collected management information has an existing network management information format. The format converting unit 3*b* converts the existing network management information format of the management information into a new-type network management information format. The new-type network management information format is the format of management information used by the new-type network 2. In the new-type network management information format, the entire existing network 1 composed of the communication equipment 3–5 is handled as one network element.

The format-converted management information is transmitted to the at least one operation system 6 by the transmitting unit 3*c*. The at least one operation system 6 processes the transmitted management information by regarding the entire existing network 1 as one network element, without recognizing the communication equipment 3–5 separately.

The first communication equipment 3 is not required to have standard communication converters associated respectively with the communication equipment 4, 5. Consequently, the first communication equipment 3 has a relatively small hardware scale, handles a relatively small amount of software-processed information, and can easily collect management information.

The new-type network may be an SDH (Synchronous Digital Hierarchy) communication network, for example, and the existing network may be a PDH (Presiochronous Digital Hierarchy) communication network, for example.

The communication monitoring and controlling apparatus according to the first embodiment will be described in detail below.

Figure 2:
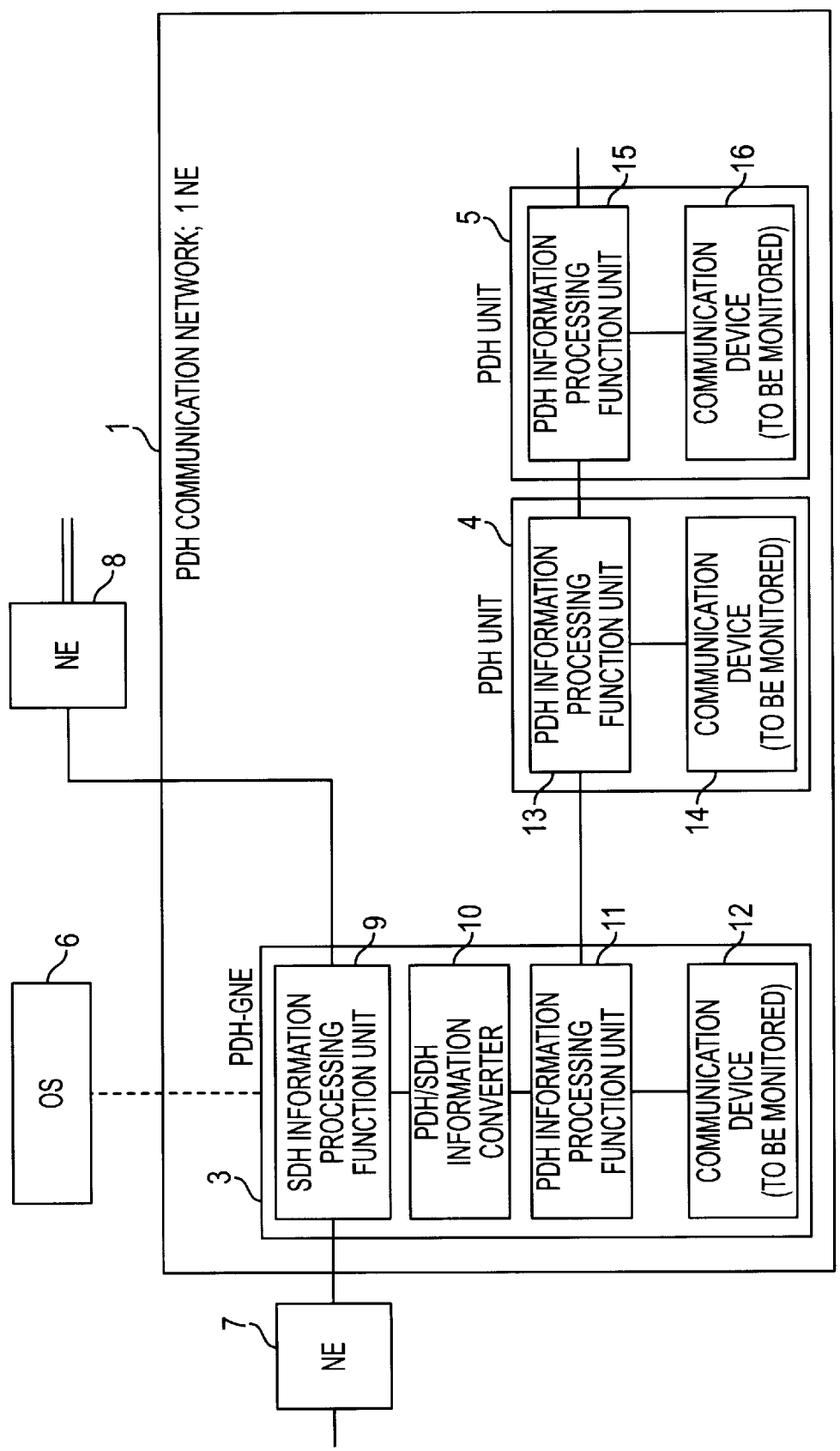
FIG. 2 is a block diagram of an internal structure of communication equipments shown in FIG. 1.

FIG. 2 shows in block form an internal structure of the communication equipment 3, 4, 5 shown in FIG. 1. In FIG. 2, the first communication equipment 3 is represented by Presiochronous Digital Hierarchy-General Network Element (PDH-GNE), the communication equipment 4, 5 by PDH units, the operation system by OS, and each of the network elements by NE.

The PDH-GNE 3 comprises an SDH information processing function unit 9, a PDH/SDH information converter 10, a PDH information processing function unit 11, and a communication device 12. The communication device 12 is a communication device to be monitored and controlled by the OS 6.

The PDH units 4, 5 comprise respective PDH information processing function units 13, 15 and respective communication devices 14, 16. The communication devices 14, 16 are communication devices to be monitored and controlled by the OS 6.

The PDH information processing function units 11, 13, 15 serve to collect and process management information of the corresponding communication devices 12, 14, 16. The PDH information processing function unit 11 of the PDH-GNE 3 collects the management information from the PDH information processing function units 13, 15, and transmits the collected management information from the PDH information processing function units 13, 15 and its own collected management information to the PDH/SDH information converter 10. The collected management information which has been transmitted is of the PDH management information format. The PDH/SDH information converter 10 converts the management information from the PDH management information format into SDH management information of an SDH management information format that is prescribed by the SDH communication network. The PDH-GNE 3 and all the PDH units 4, 5 governed thereby of the existing network 1 are defined as one NE. Thereafter, the format-converted management information is processed according to a protocol by the SDH information processing function unit 9, and then transferred to the OS 6.

Management information (controlling information) from the OS 6 is also transmitted to the PDH units along a reverse route.

In this manner, only the PDH-GNE 3 of the existing network 1 has a function to interface with the SDH network with respect to management information and a function to process management information. The PDH-GNE 3 does not handle the communication devices 12, 14, 16 to be managed thereby as separate NEs, but handle them as objects to be managed within an NE.

Therefore, the existing network 1 can be defined as a single NE, and PDH and SDH management networks can easily be integrated with each other.

The management information collecting unit 3*a* shown in FIG. 1 is included in the PDH information processing function unit 11 shown in FIG. 2. Similarly, the format converting unit 3*b* is included in the PDH/SDH information converter 10, and the transmitting unit 3*c* is included in the SDH information processing function unit 9.

Figure 3:
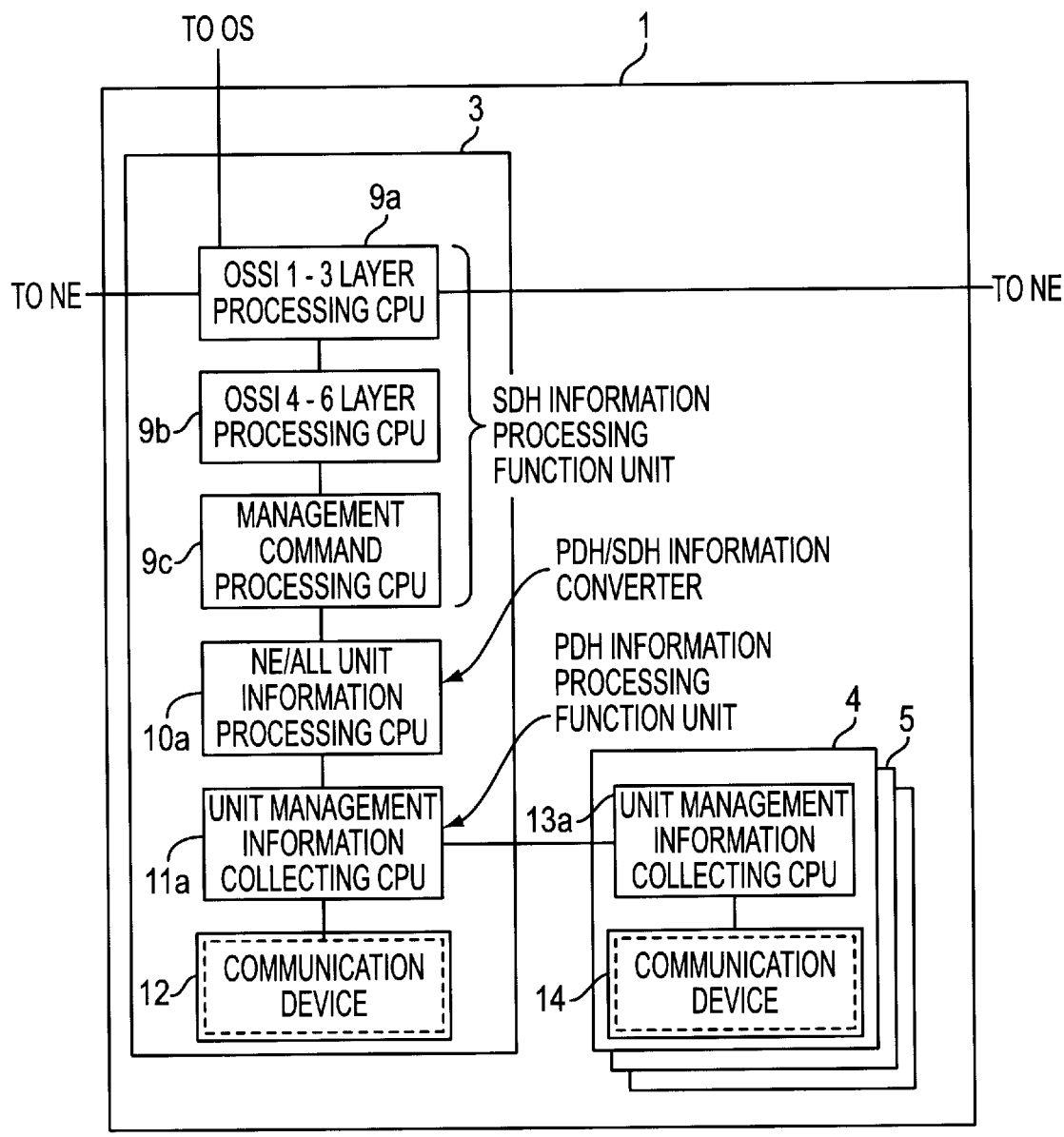
FIG. 3 is a block diagram of a hardware arrangement of a Presiochronous Digital Hierarchy-General Network Element (PDH-GNE) and a PDH unit shown in FIG. 2.

FIG. 3 shows in block form a hardware arrangement of the PDH-GNE 3 and the PDH units 4, 5 shown in FIG. 2. The SDH information processing function unit 9 shown in FIG. 2 comprises an operation support system interface (OSSI) 1–3 layer processing CPU 9*a*, an OSSI 4–6 layer processing CPU 9*b*, and a management command processing CPU 9*c*. The PDH/SDH information converter 10 shown in FIG. 2 comprises an NE/all unit information processing CPU 10*a*. The PDH information processing function unit 11 shown in FIG. 2 comprises a unit management information collecting CPU 11*a*. The PDH information processing function unit 13 of the PDH unit 4 shown in FIG. 2 comprises a unit management information collecting CPU 13*a*.

Heretofore, each of the PDH units of the PDH communication network has required a device which corresponds to the SDH information processing function unit 9 which is composed of the OSSI 1–3 layer processing CPU 9*a*, the OSSI 4–6 layer processing CPU 9*b*, and the management command processing CPU 9*a*. According to the present invention, as shown in FIG. 3, the SDH information processing function unit 9 is provided only in the PDH-GNE 3, but not in the PDH units 4, 5. Therefore, simply by adding NE/all unit information processing CPU 10*a* and the unit management information collecting CPU 11a, the OSSI 1–3 layer processing CPU 9a, the OSSI 4–6 layer processing CPU 9b, and the management command processing CPU 9a can be eliminated from each of the PDH units 4, 5. According to the present invention, consequently, the communication monitoring and controlling apparatus has a reduced hardware scale, and the hardware scale is reduced at a rate which is greater as the number of PDH units is greater.

Software-implemented information processing such as setting up of dates and times, identification names of PDH units, and transmission of connection confirmation commands, which has heretofore been executed by each of the PDH units, may be executed only by the PDH-GNE 3. According to the present invention, consequently, the communication monitoring and controlling apparatus sees a reduced amount of software-processed information, and the amount of software-processed information is reduced at a rate which is greater as the number of PDH units is greater.

A second embodiment of the present invention will be described below.

Figure 4:
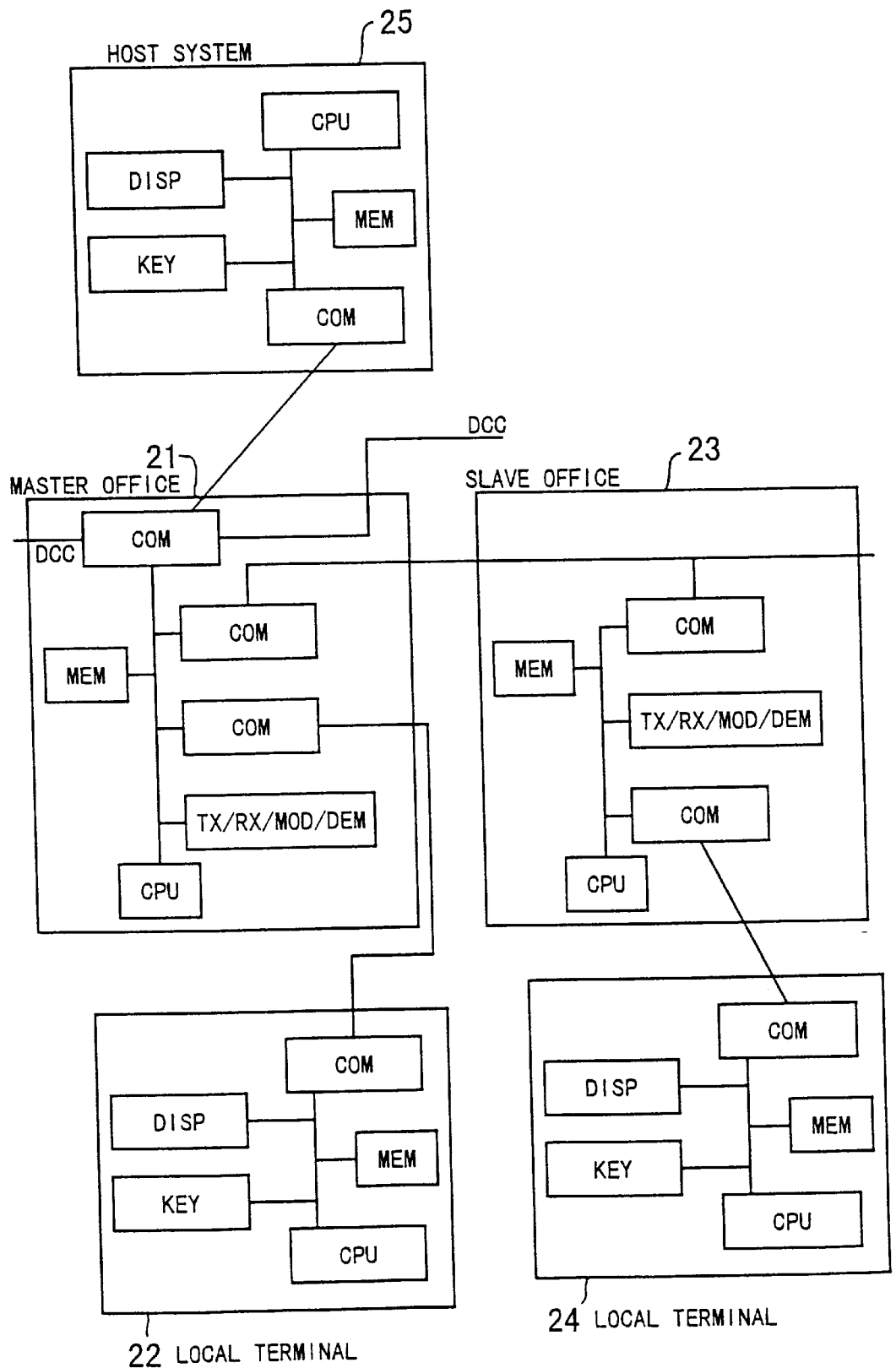
FIG. 4 is a block diagram of a communication network according to a second embodiment of the present invention.

FIG. 4 shows in block form a communication network according to the second embodiment. As shown in FIG. 4, a PDH communication network comprises a master office 21, a local terminal 22 connected to the master office 21, a slave office 23, and a local terminal 24 connected to the slave office 23. The master office 21 and the slave office 23 comprise PDH communication units, respectively. Although only one slave office is illustrated, there are actually many slave offices connected to the PDH communication network. The PDH communication network is handled as one network element, and is connected to another network element (not shown in FIG. 4) through the master office 21 via a DCC (Data Communication Channel). A plurality of such network elements make up an SDH communication network. Either one of the network elements is connected to a host system 25 as an operation system. While the host system 25 is shown as being connected to the master office 21 in FIG. 4, the host system 25 may be connected to another network element.

Figure 5:
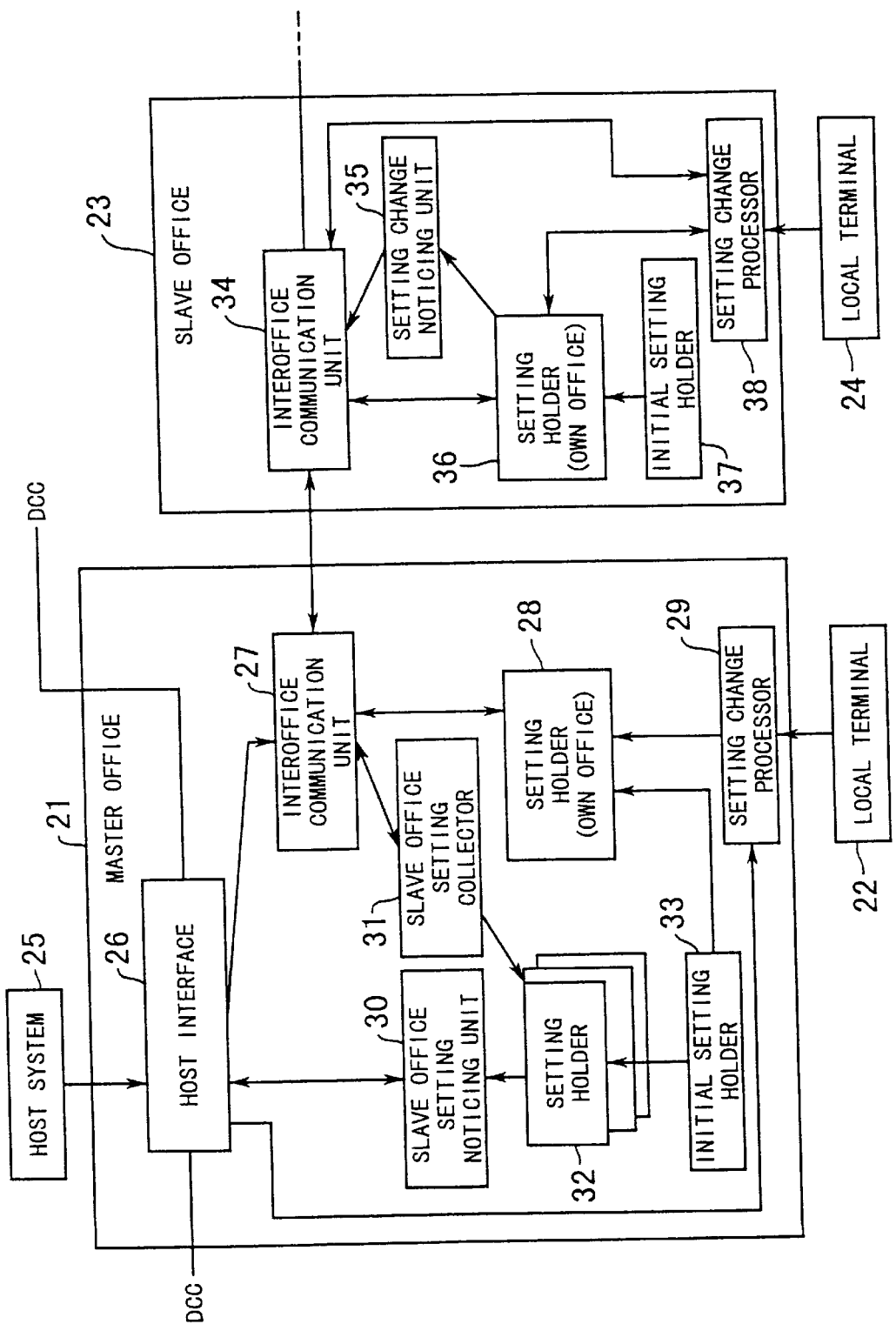
FIG. 5 is a block diagram of functions performed by hardware arrangements of master and slave offices shown in FIG. 4.

In FIG. 4, each CPU serves as a data processor for executing a program stored in MEM and performing functions shown in FIG. 5. The "MEM" represents a memory for storing programs and processed data. Setting information, described later on, is stored in the MEM. "KEY" represents a data inputting unit such as a keyboard which is operable by the operator to enter data. "DISP" represents a data outputting unit such as a CRT, a printer, etc. for outputting data to the operator. "COM" represents a communication data processor for transmitting data to and receiving data from another unit. "TX/RX/MOD/DEM" represents a communication device for transmitting, receiving, modulating, and demodulating data. The communication device requires setting information and is a communication device to be monitored.

FIG. 5 shows in block form functions performed by hardware arrangements of the master office 21 and the slave office 23 shown in FIG. 4. Details of the functions will be described below with reference to FIGS. 6–9.

Figure 6:
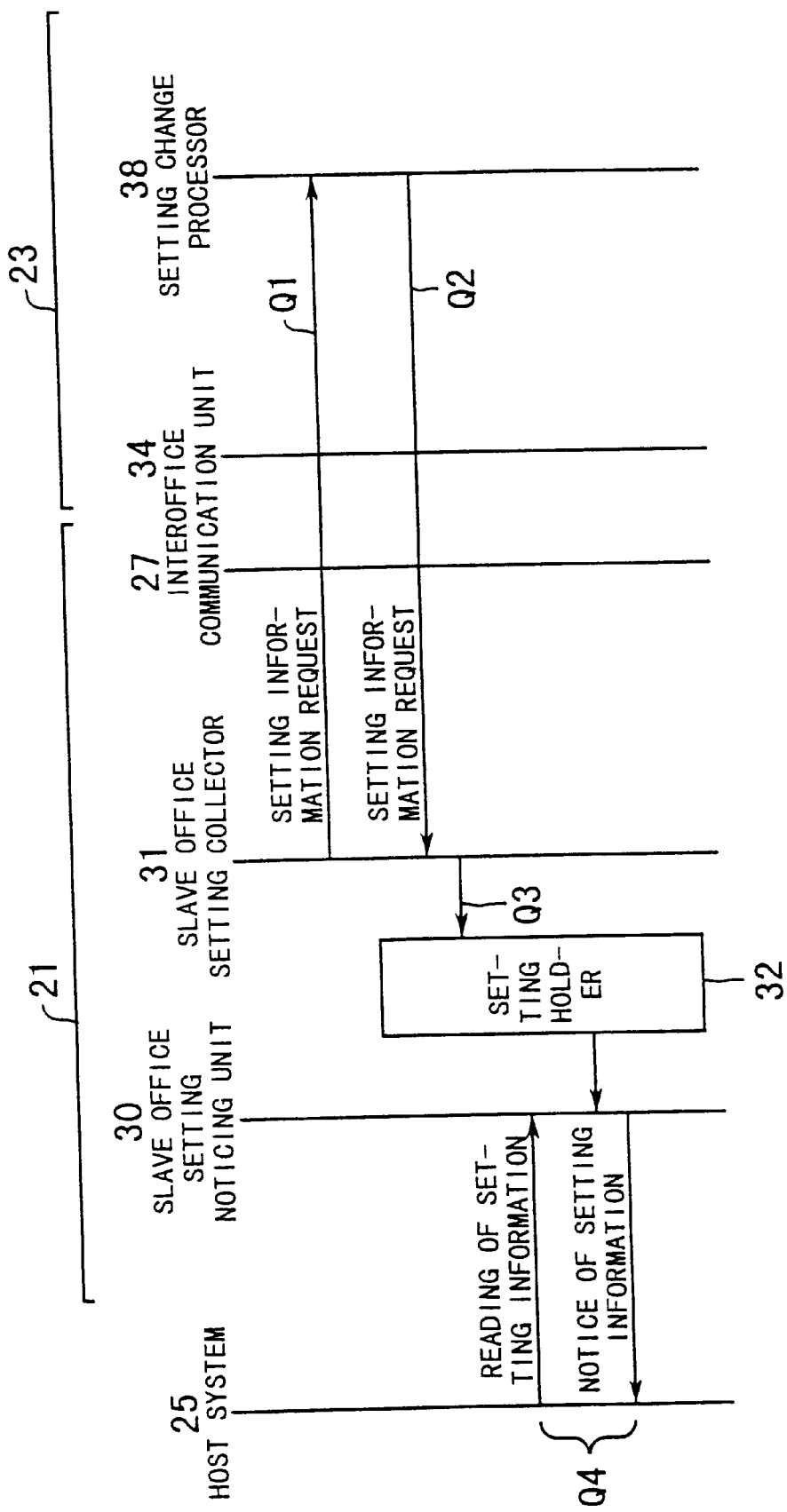
FIG. 6 is a sequence diagram of a processing sequence carried out when the master office collects setting information from each slave office and holds the setting information in a setting holder.
Figure 10:
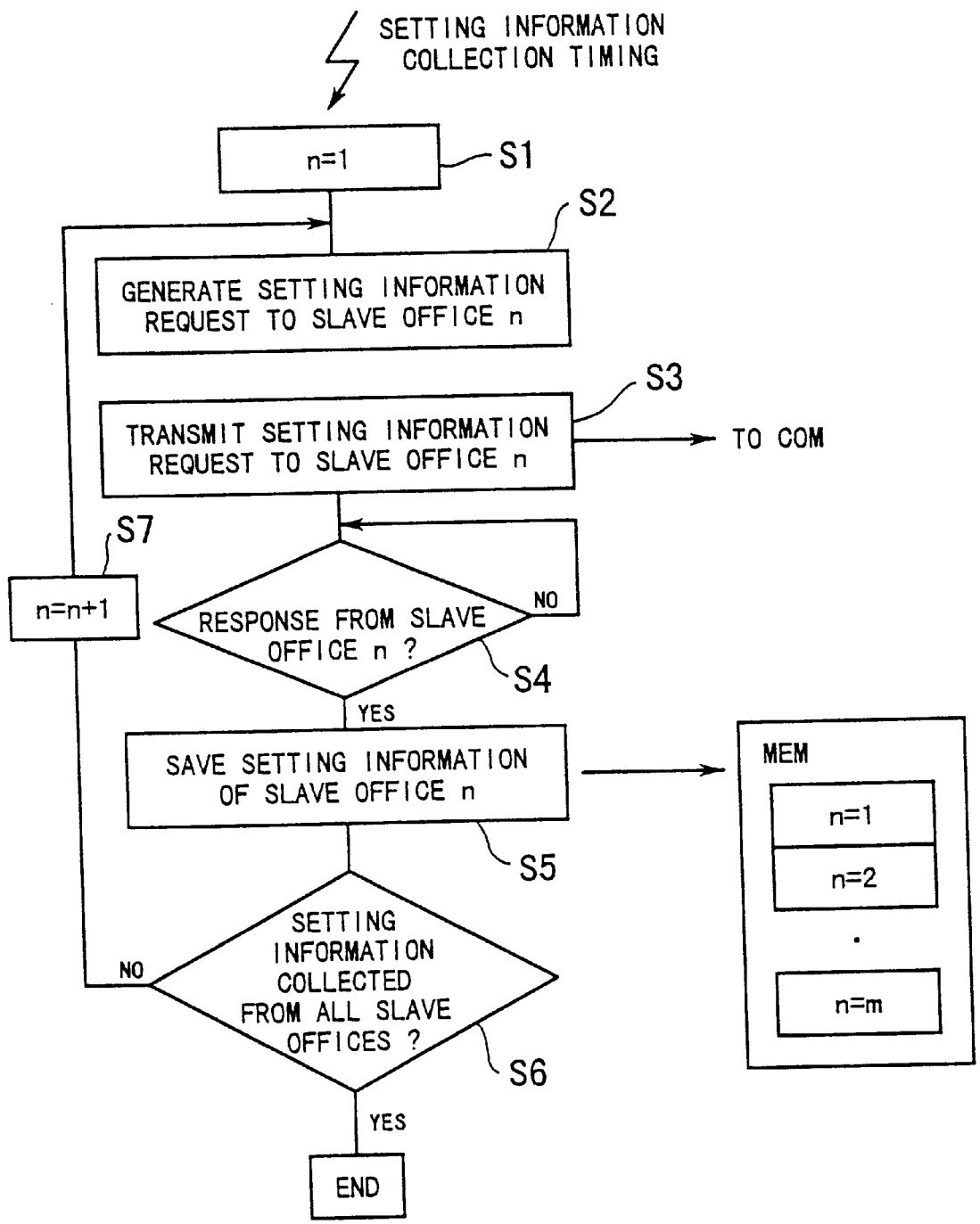
FIG. 10 is a flowchart of a processing operation of the master office with respect to each slave office.
Figure 11:
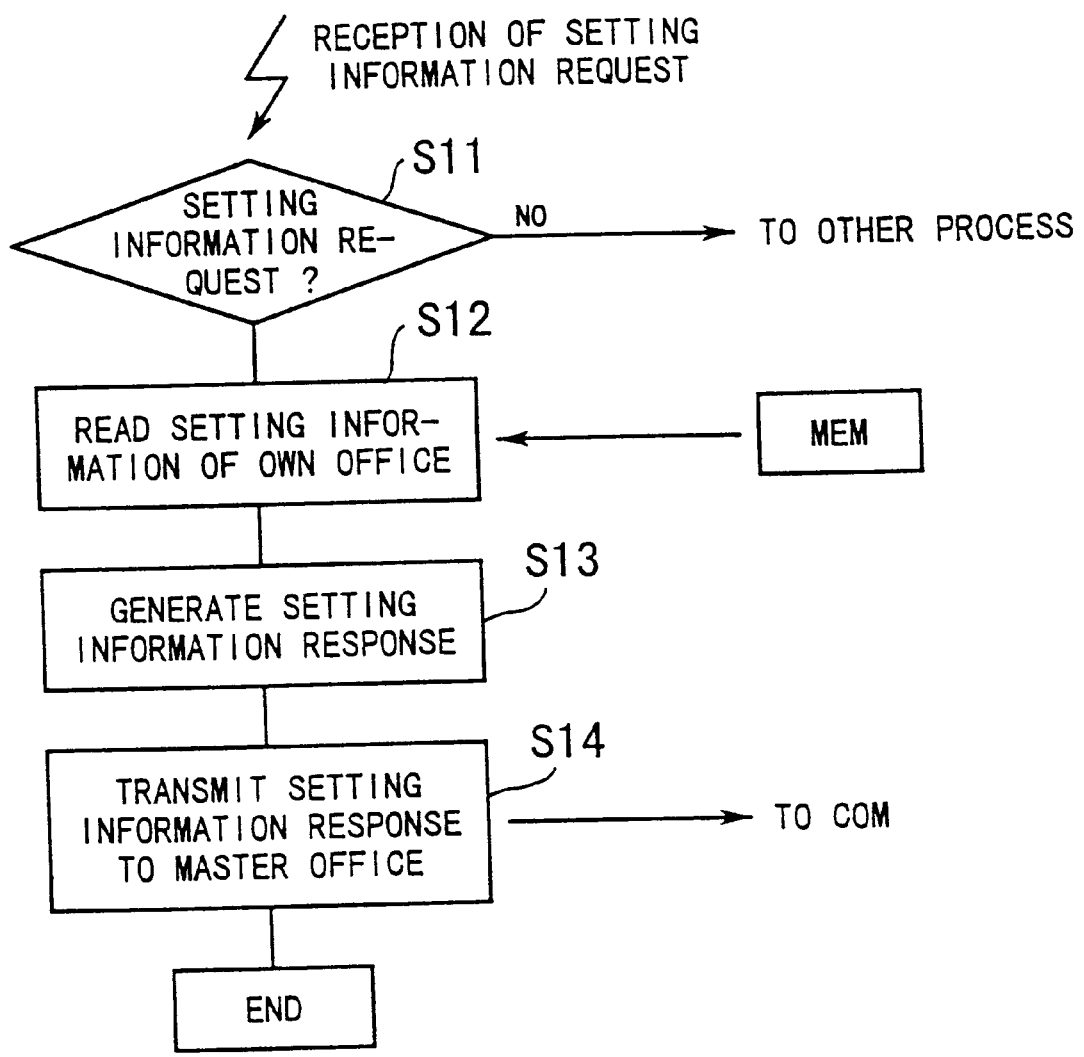
FIG. 11 is a flowchart of a processing operation of each slave office.
Figure 12:
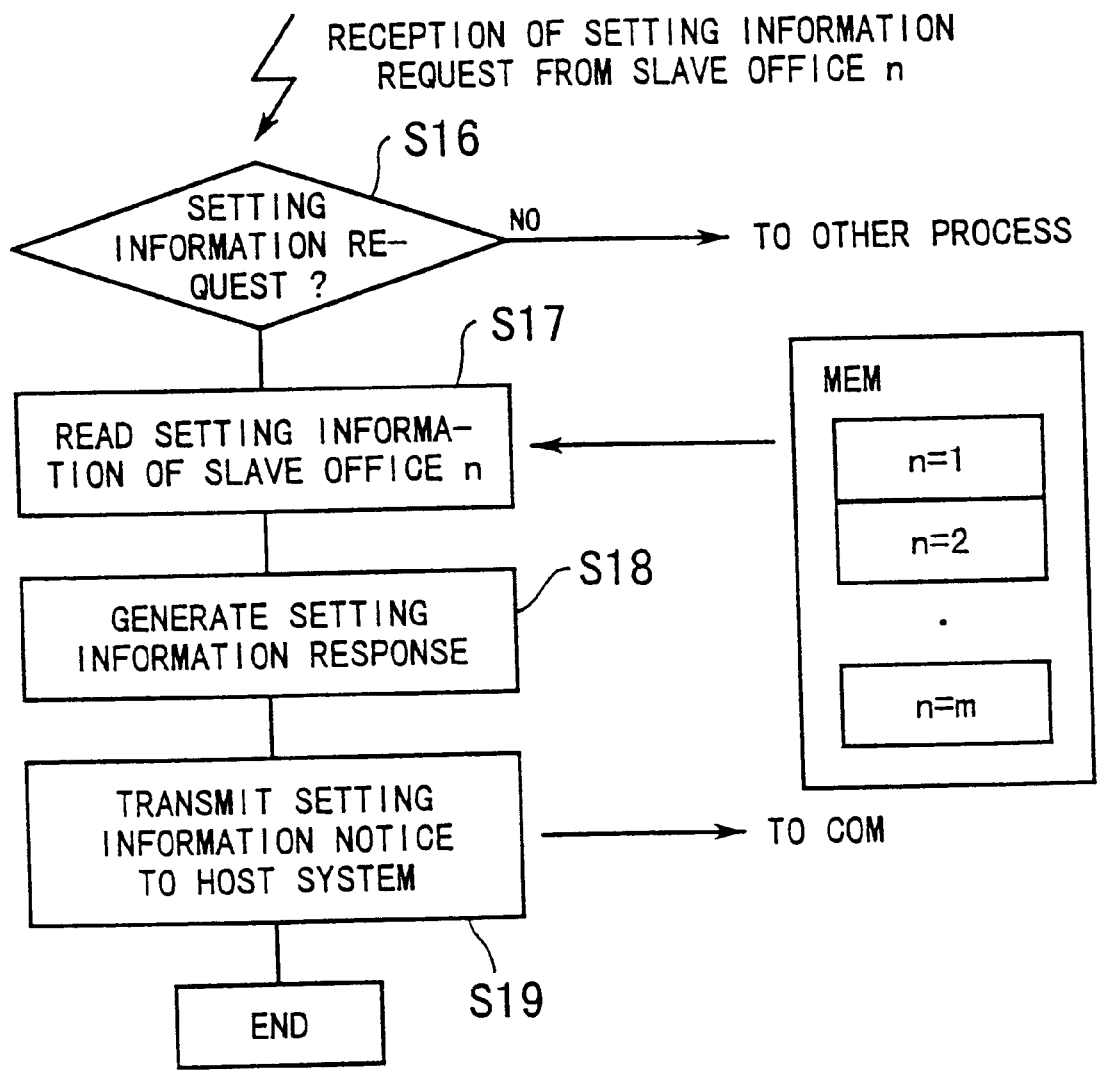
FIG. 12 is a flowchart of a processing operation of the master office with respect to the host system.

FIG. 6 shows a processing sequence carried out when the master office 21 collects setting information from each slave office and holds the setting information in a setting holder 32. The processing sequence will be described below with respect to sequence numbers (Q) shown in FIG. 6. Processing operations of the master office 21 and each slave office are shown in FIGS. 10–12. Step numbers (S) shown in FIGS. 10–12 will be referred to in the description of the processing sequence shown in FIG. 6. FIG. 10 shows a processing operation of the master office 21 with respect to each slave office. FIG. 11 shows a processing operation of each slave office. FIG. 12 shows a processing operation of the master office 21 with respect to the host system 25. (Q1) Each time the power supply is turned on or at each time interval, a slave office setting collector 31 of the master office 21 transmits a setting information request to each slave office to request each slave office to transmit its setting information to the master office 21 (steps S1, S2, S3, S6, S7 in FIG. 10). For example, the slave office setting collector 31 of the master office 21 transmits a setting information request to a setting change processor 38 of the slave office 23 via interoffice communication units 27, 34.

(Q2) The setting change processor 38 of the slave office 23 reads setting information of the slave office 23 from a setting holder 36 (steps S11, S12 in FIG. 11). The setting change processor 38 generates a setting information response, and transmits the setting information response to the master office 21 (steps S13, S14 in FIG. 11).

(Q3) The slave office setting collector 31 of the master office 21 saves setting information transmitted from each slave office in the setting holder 32 (steps S4, S5 in FIG. 10). The setting holder 32 has storage areas assigned to the respective slave offices, and stores the setting information in the corresponding storage areas.

(Q4) When the host system 25 transmits a message to the master office 21 to read the setting information of a slave office N and transmits the setting information, a slave office setting noticing unit 30 of the master office 21 receives the message via a host interface 26. The slave office setting noticing unit 30 reads the setting information of the slave office N from the setting holder 32 (steps S16, S17 in FIG. 12). The office setting noticing unit 30 generates a setting information notice, and transmits the setting information notice to the host system 25 (steps S18, S19 in FIG. 12).

As described above, since the setting information of each slave office is held in the master office at all times, when the master office 21 is asked by the host system 25 to send the setting information of a certain slave office, the master office 21 is not required to ask the slave office, but can quickly respond to the host system 25.

Figure 7:
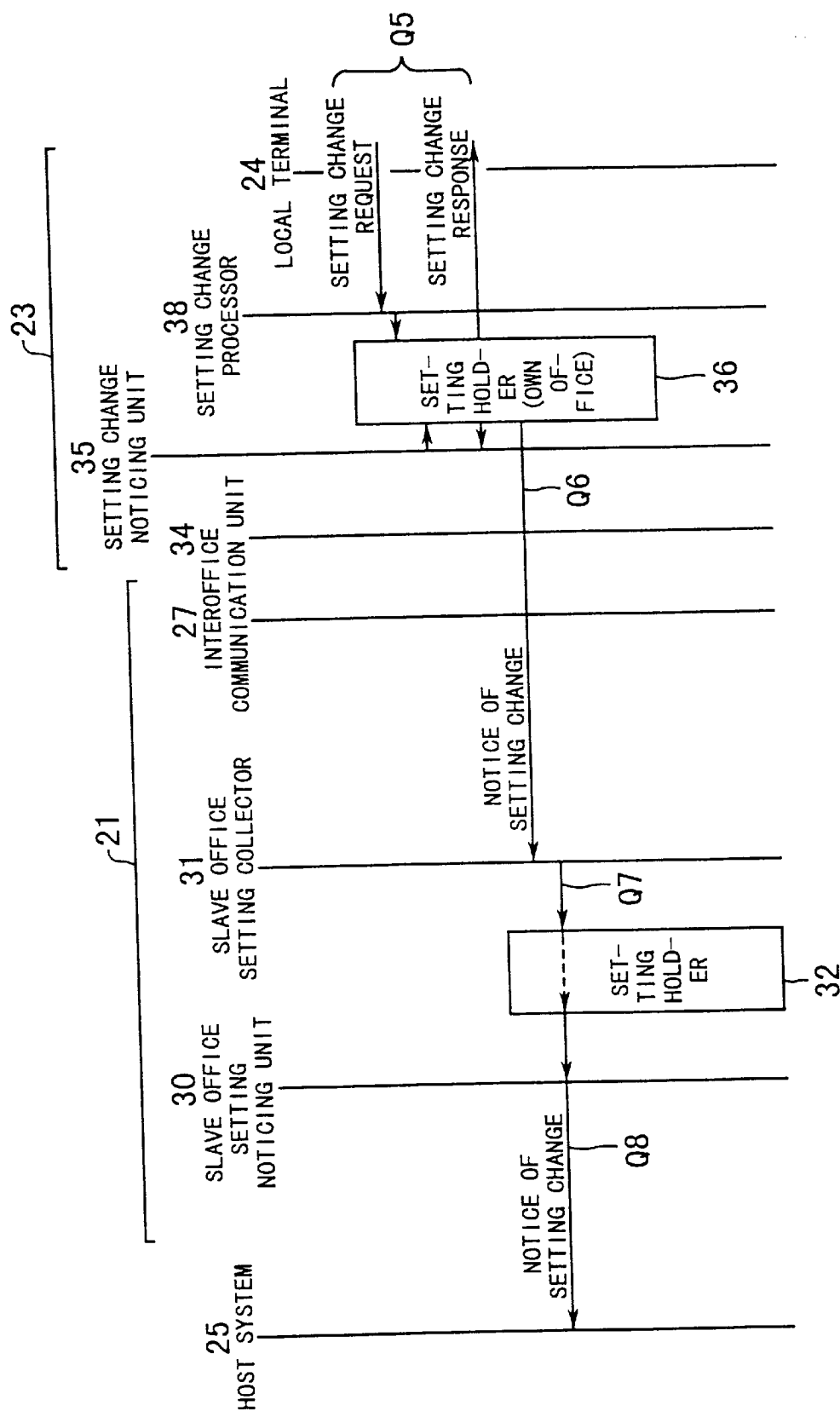
FIG. 7 is a sequence diagram of a processing sequence carried out by the slave and master offices when each slave office is requested to change setting information from a local terminal.
Figure 13:
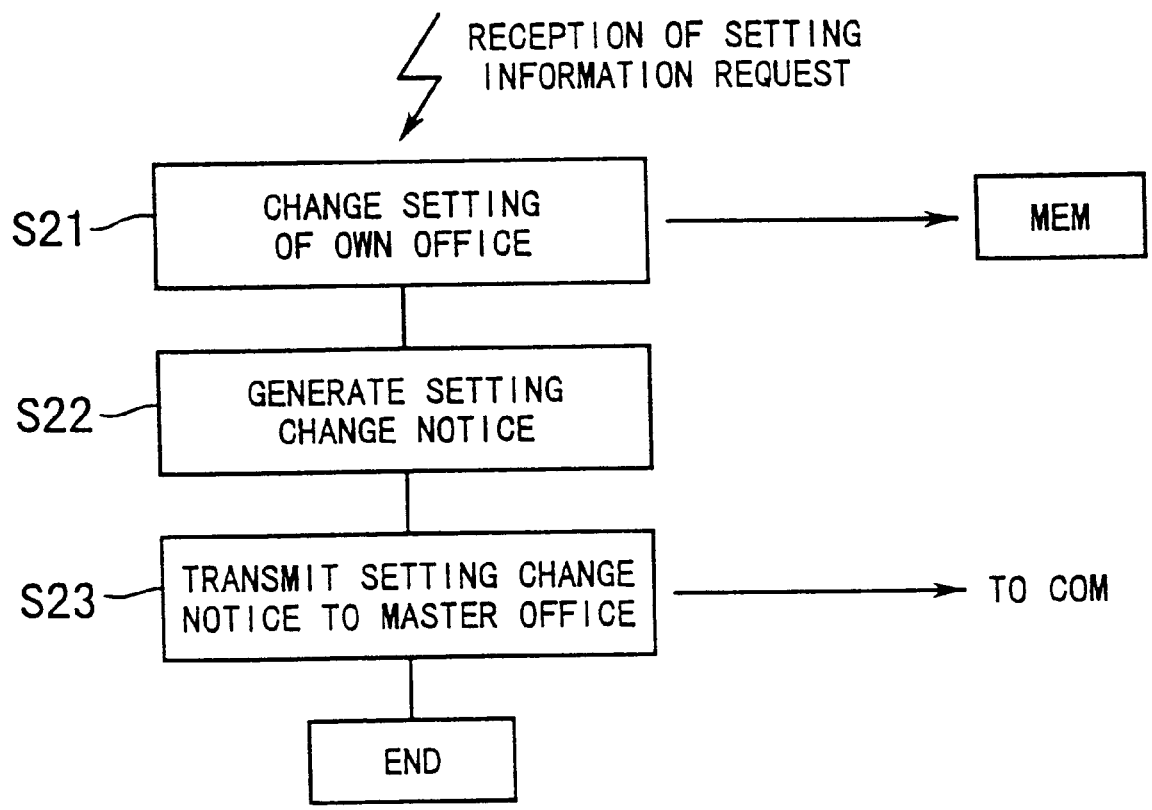
FIG. 13 is a flowchart of a processing operation of a slave office which is requested to change setting information.
Figure 14:
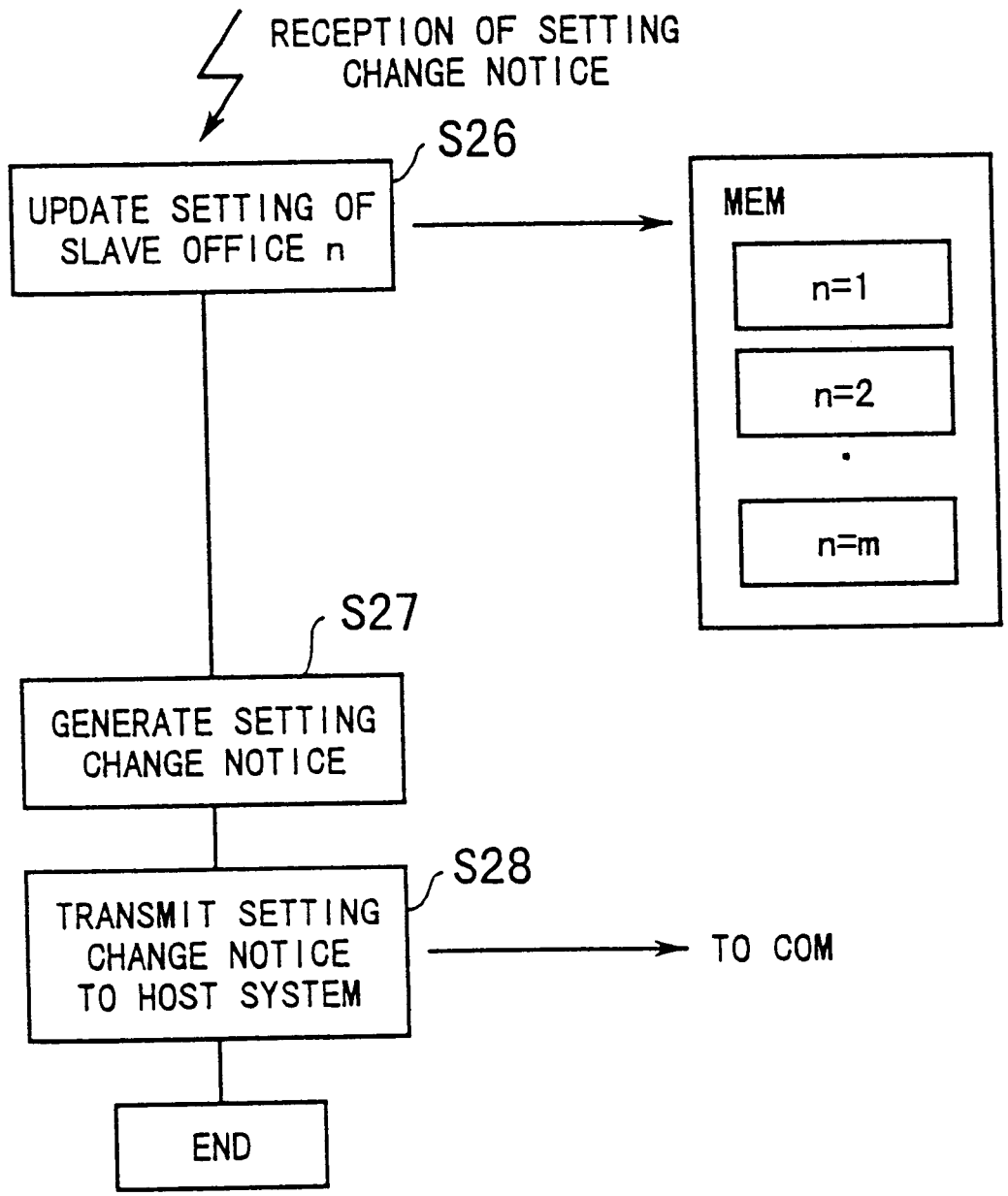
FIG. 14 is a flowchart of a processing operation of the master office with respect to each slave office.
Figure 15:
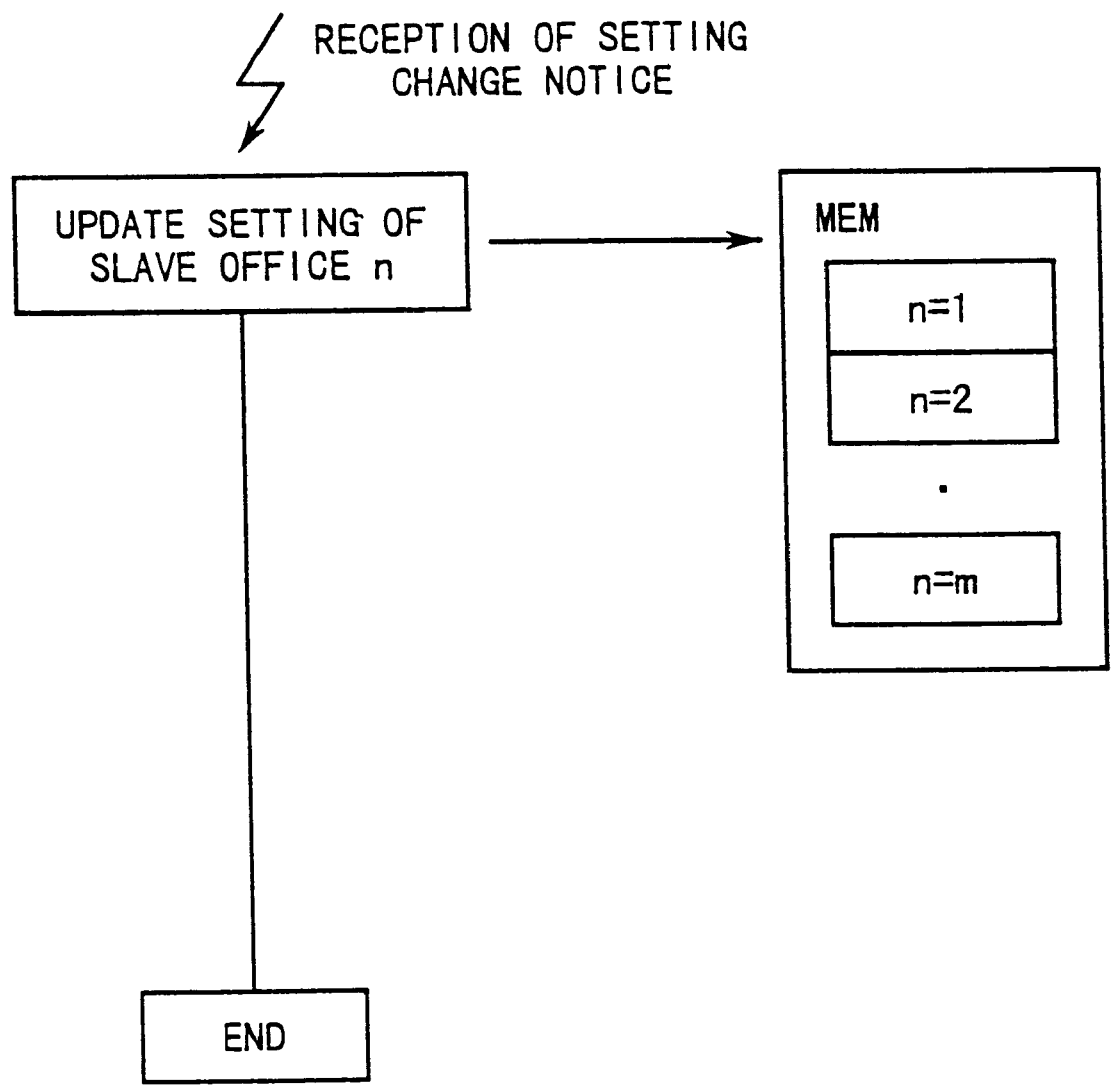
FIG. 15 is a flowchart of a processing operation of the host system.

FIG. 7 shows a processing sequence carried out by the slave and master offices when each slave office is requested to change setting information from the local terminal. The processing sequence will be described below with respect to sequence numbers (Q) shown in FIG. 7. Processing operations of the slave office requested to change setting information, the master office 21, and the host system 25 are shown in FIGS. 13–15. Step numbers (S) shown in FIGS. 13–15 will be referred to in the description of the processing sequence shown in FIG. 7. FIG. 13 shows a processing operation of the slave office which is requested to change setting information. FIG. 14 is a processing operation of the master office 21 with respect to each slave office. FIG. 15 shows a processing operation of the host system 25.

(Q5) It is assumed that the operator has sent a setting change request to change setting information of the slave office 23 via the local terminal 24 connected to the slave office 23. The setting change processor 38 of the slave office 23 effects a setting changing process according to the setting change request, and changes the setting information stored in the setting holder 36 (step S21 in FIG. 13)

(Q6) When the setting information has been changed, a setting change noticing unit 35 of the slave office 23 refers to the setting holder 36, extracts the changed setting, and transmits a setting change notice to the slave office setting collector 31 of the master office 21 (steps S22, S23 in FIG. 13).

(Q7) The slave office setting collector 31 updates the setting information of the slave office 23 which is stored in the setting holder 32 (step S26 in FIG. 14).

(Q8) When the setting information has been updated, the slave office setting noticing unit 30 of the master office 21 refers to the setting holder 32, extracts the changed setting, and transmits a setting change notice to the host system 25 (steps S27, S28 in FIG. 14). The host system 25 updates the setting information of the slave office 23 (see FIG. 15).

Therefore, when setting information in each slave office is locally changed, the host system 25 and the master office 21 can automatically and immediately recognize the setting change rather than receiving the setting change only after the host system 25 and the master office 21 have sent a request to read the setting information to the slave office.

Figure 8:
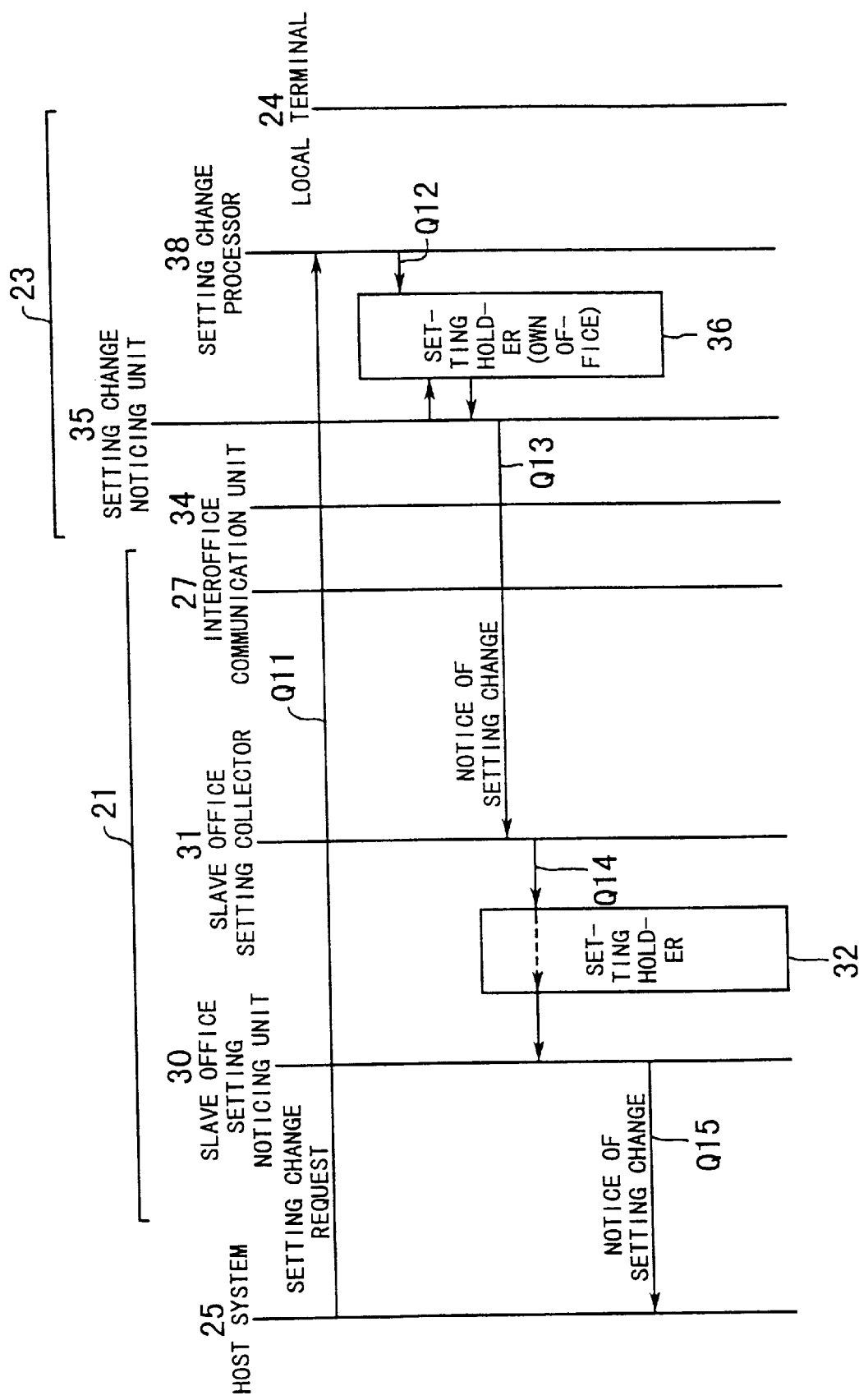
FIG. 8 is a sequence diagram of a processing sequence carried out when a host system changes setting information in each slave office.
Figure 16:
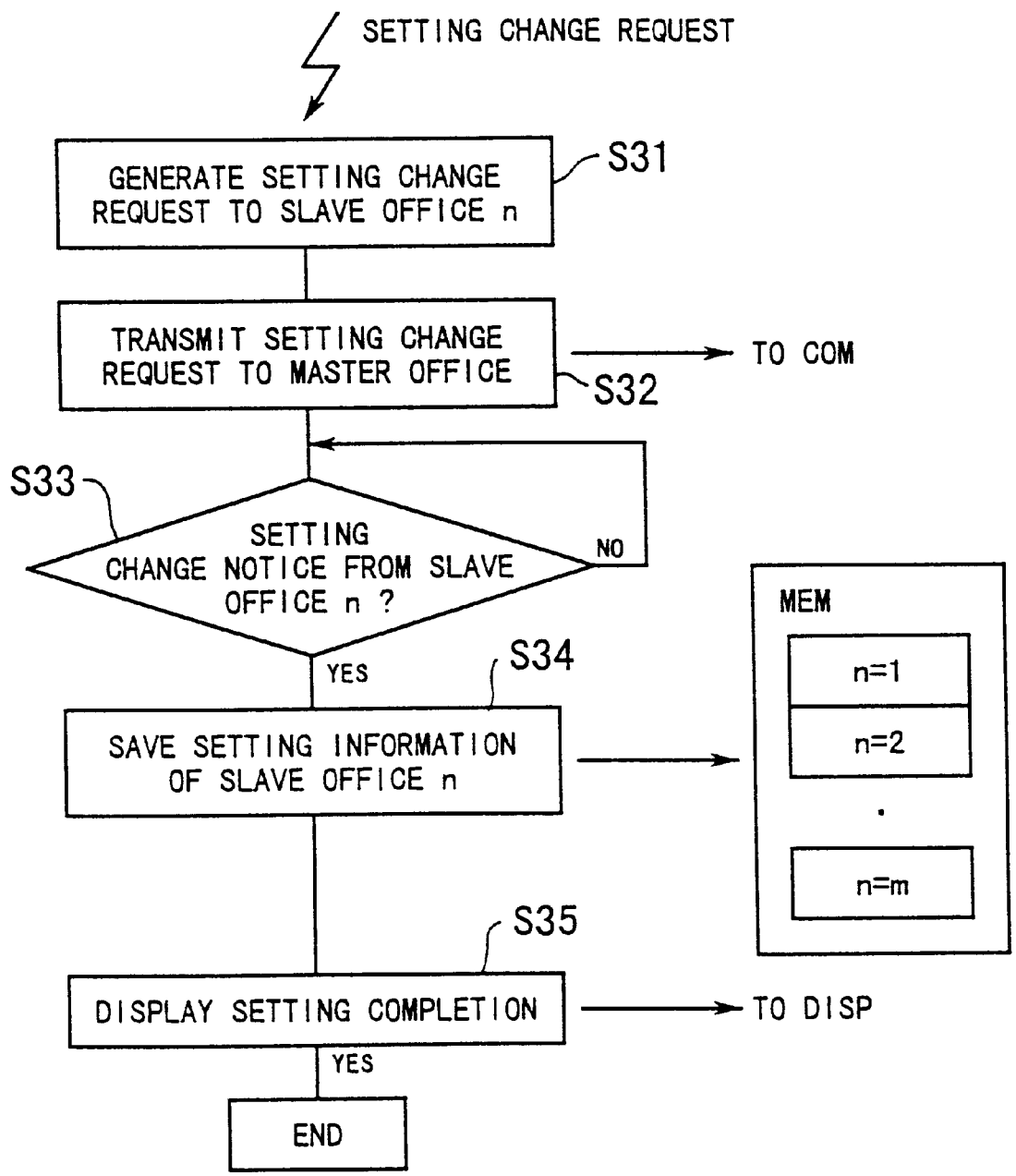
FIG. 16 is a flowchart of a processing operation of the host system.

FIG. 8 shows a processing sequence carried out when the host system 25 changes setting information in each slave office. The processing sequence will be described below with respect to sequence numbers (Q) shown in FIG. 8. A processing operation of the host system 25 is shown in FIG. 16. Step numbers (S) shown in FIG. 16 will be referred to in the description of the processing sequence shown in FIG. 8.

(Q11) It is assumed that the host system 25 sends a setting change request to change the setting information of the slave office 23 via the master office 21 to the slave office 23 (steps S31, S32 in FIG. 16).

(Q12) Sequence steps Q12–Q15 are identical to the sequence steps Q5–Q8 which are effected when a setting change request is transmitted from the local terminal 24. The setting change processor 38 of the slave office 23 effects a setting changing process according to the setting change request, and changes the setting information stored in the setting holder 36.

(Q13) When the setting information has been changed, the setting change noticing unit 35 of the slave office 23 refers to the setting holder 36, extracts the changed setting, and transmits a setting change notice to the slave office setting collector 31 of the master office 21.

(Q14) The slave office setting collector 31 updates the setting information of the slave office 23 which is stored in the setting holder 32.

(Q15) When the setting information has been updated, the slave office setting noticing unit 30 of the master office 21 refers to the setting holder 32, extracts the changed setting, and transmits a setting change notice to the host system 25.

When the host system 25 receives the setting change notice with respect to the slave office 23, the host system 25 updates the setting information of the slave office 23, and displays a setting completion message on its own data outputting unit (steps S33, S34, S35 in FIG. 16).

As described above, setting information of each slave office can be changed from the host system 25 in the same manner as setting information of each slave office is changed from the local terminal connected thereto. Therefore, the host system 25 and each slave office may be simplified in structure.

Figure 9:
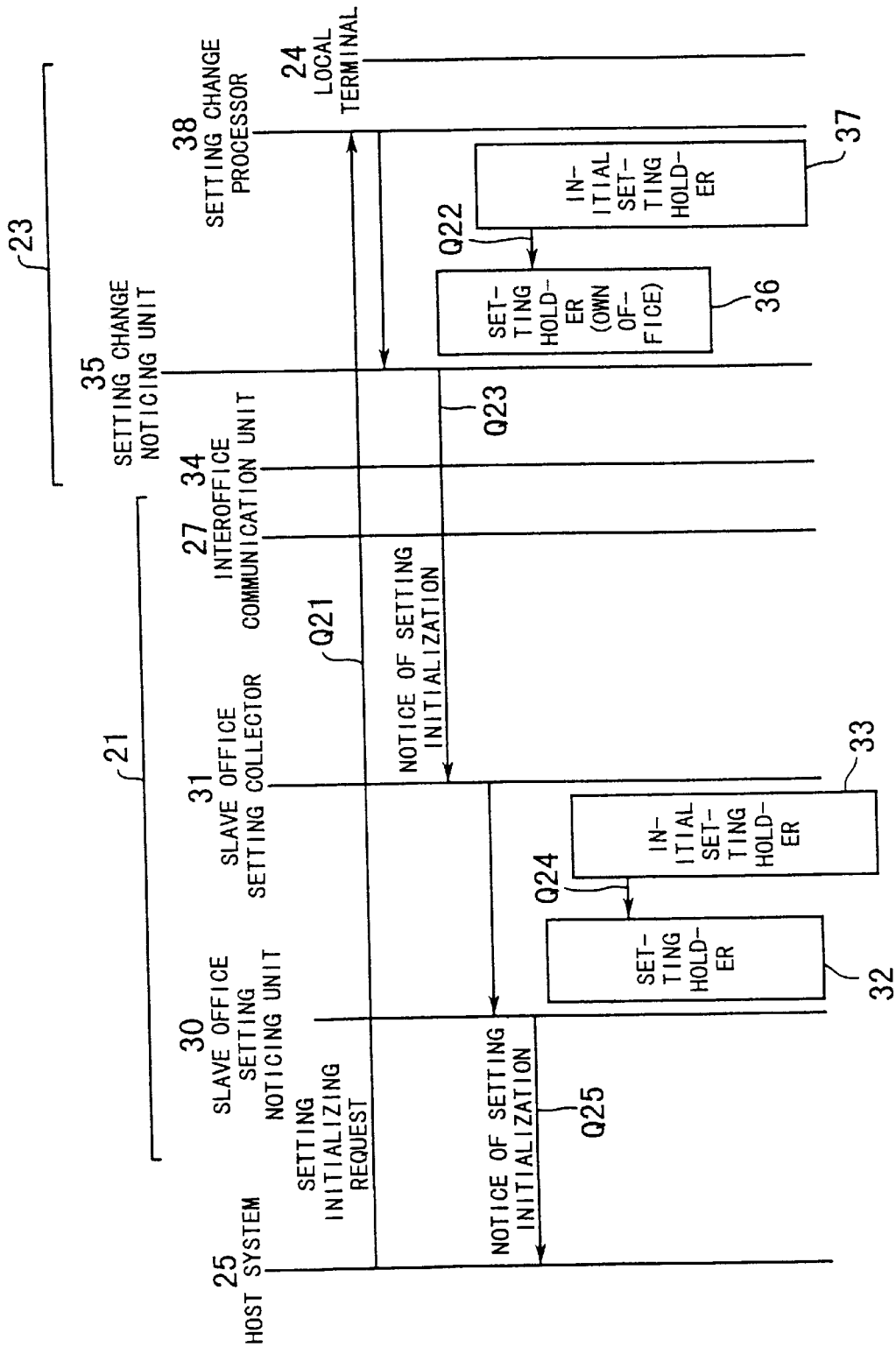
FIG. 9 is a sequence diagram of a processing sequence carried out when the host system transmits a setting initializing request to each slave office to initialize setting information.
Figure 17:
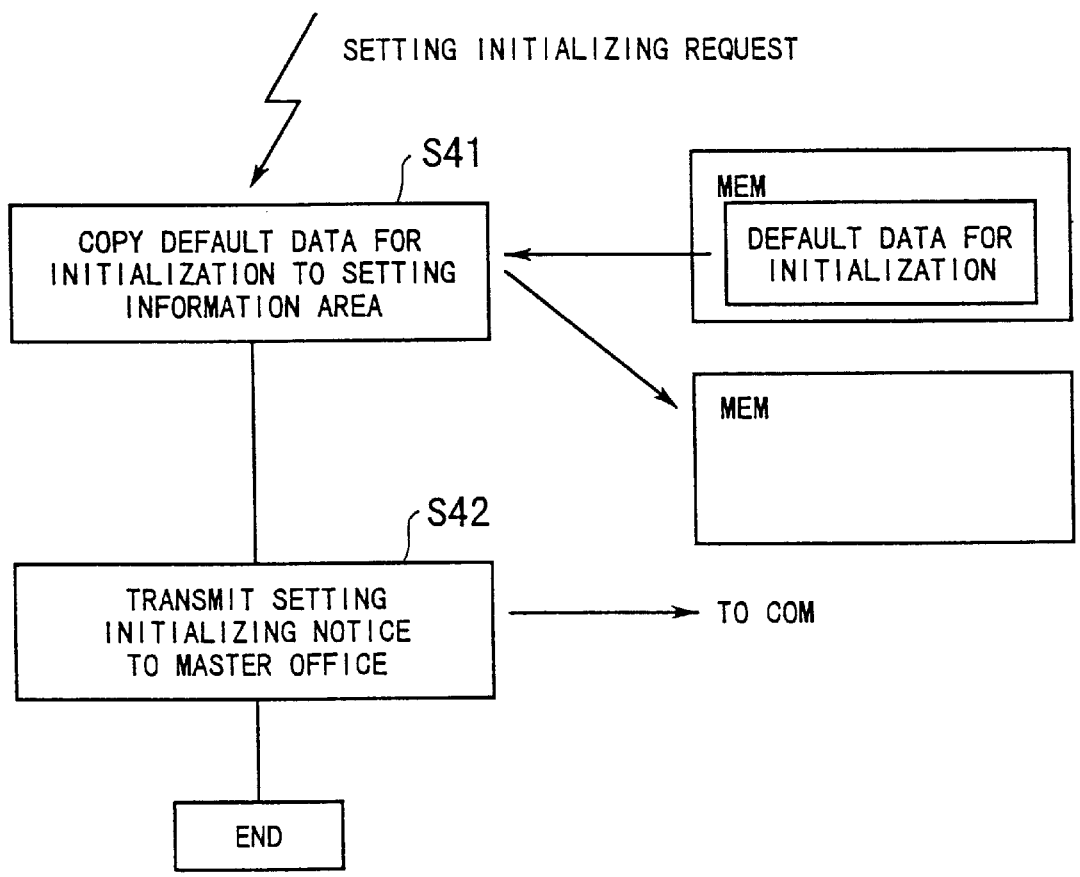
FIG. 17 is a flowchart of a processing operation of each slave office.
Figure 18:
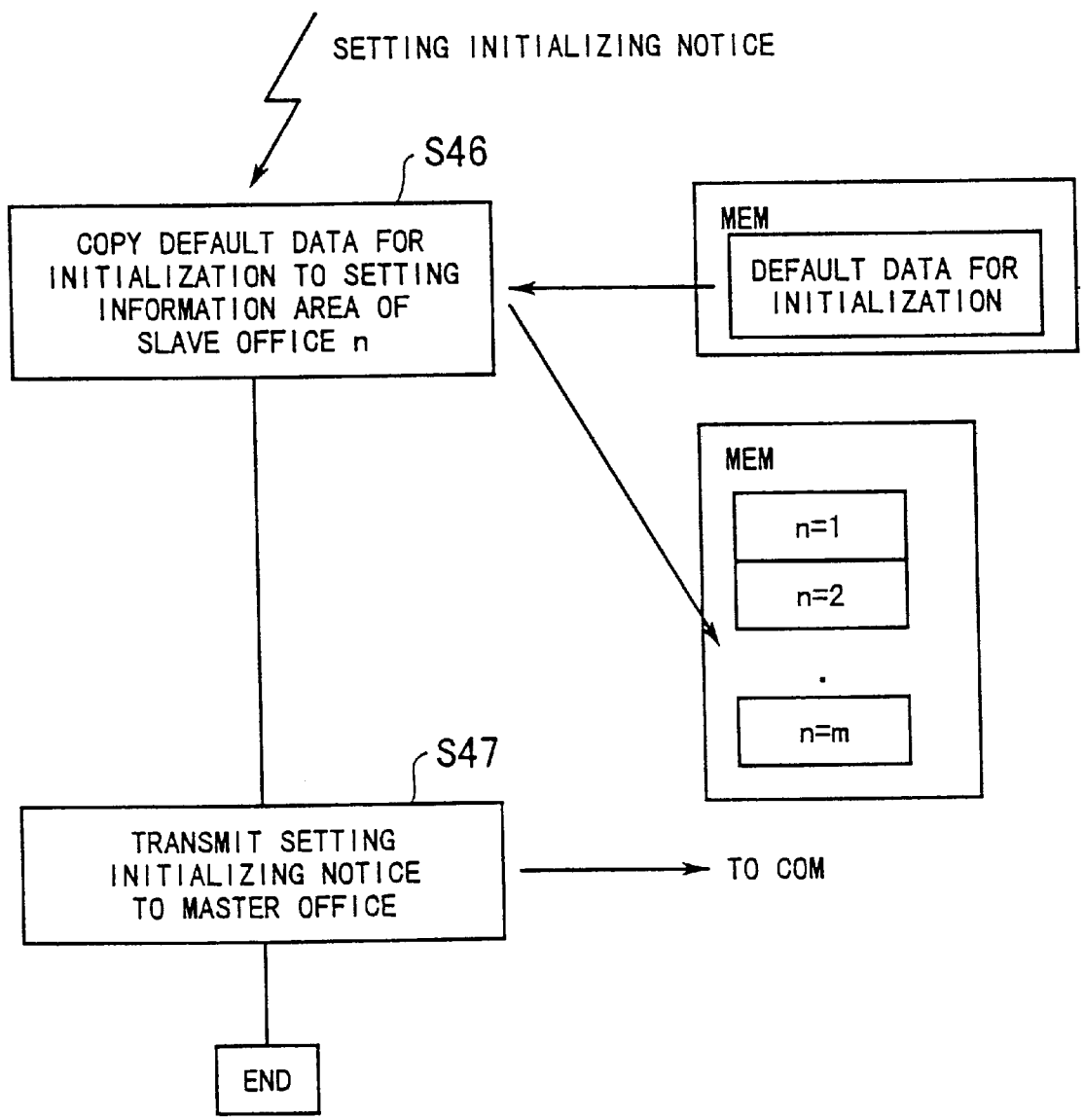
FIG. 18 is a flowchart of a processing operation of the master office with respect to each slave office.
Figure 19:
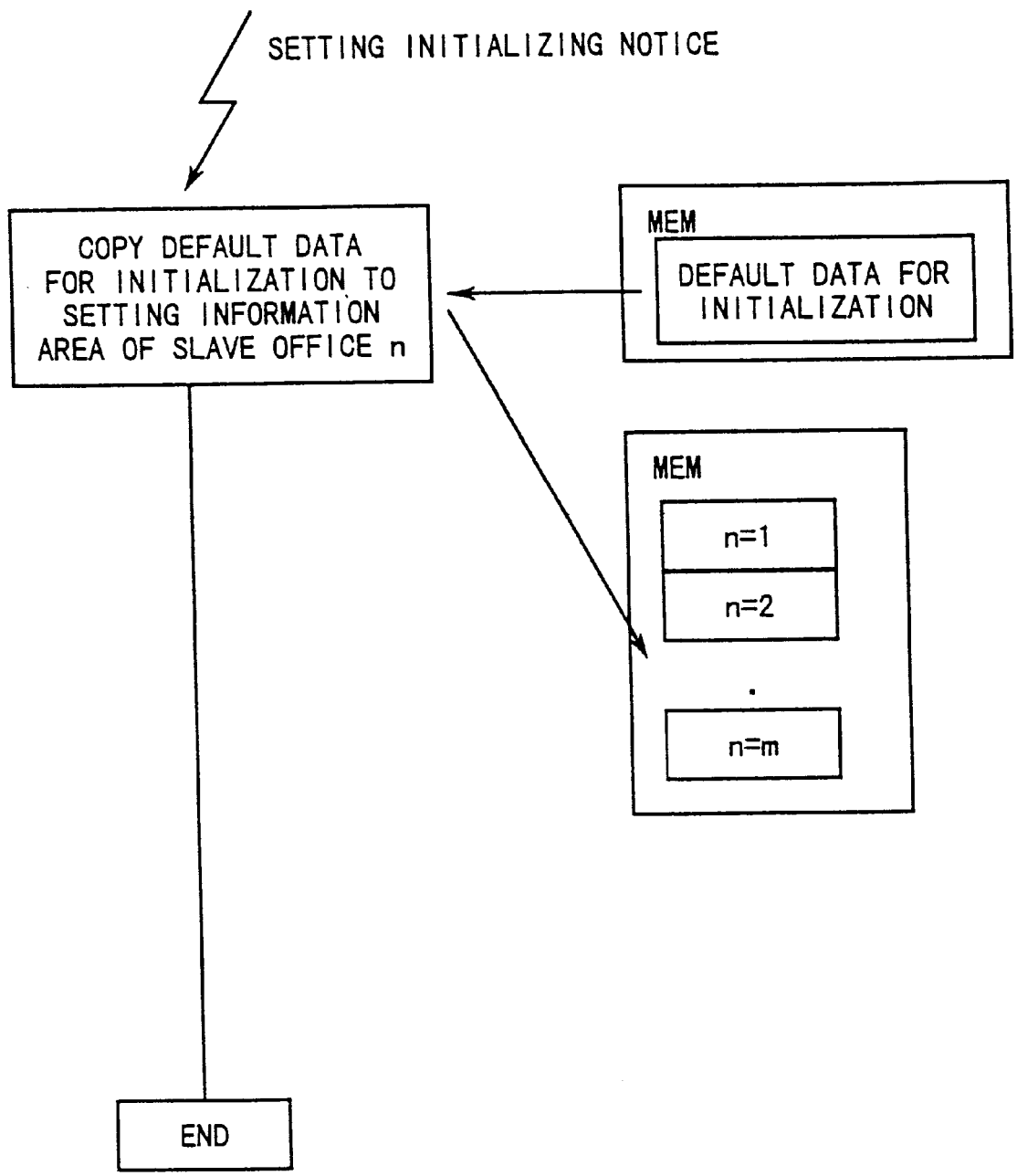
FIG. 19 is a flowchart of a processing operation of the host system.

FIG. 9 shows a processing sequence carried out when the host system 25 transmits a setting initializing request to each slave office to initialize setting information. The processing sequence will be described below with respect to sequence numbers (Q) shown in FIG. 9. Processing operations of each slave office, the master office 21, and the host system 25 are shown in FIGS. 17–19. Step numbers (S) shown in FIGS. 17–19 will be referred to in the description of the processing sequence shown in FIG. 9. FIG. 17 shows a processing operation of each slave office. FIG. 18 shows a processing operation of the master office 21 with respect to each slave office. FIG. 19 shows a processing operation of the host system 25.

(Q21) It is assumed that the host system 25 transmits a setting initializing request to initialize setting information via the master office 21 to the slave office 23.

(Q22) An initial setting holder 37 of the slave office 23 stores default data for initializing the setting information of the slave office 23. The default data for initializing the setting information is the same for all the slave offices. The setting change processor 38 of the slave office 23 copies the default data for initializing the setting information from the initial setting holder 37 to a setting information area of the setting holder 36 (step S41 in FIG. 17). (Q23) When the copying of the default data is completed, the setting change noticing unit 35 of the slave office 23 sends a setting initializing notice indicating that the initialization of the setting information is completed to the slave office setting collector 31 of the master office 21 (step S42 in FIG. 17).

(Q24) An initial setting holder 33 of the master office 21 also stores default data for initializing the setting information of the slave offices. In response to the setting initializing notice from the slave office 23, the slave office setting collector 31 of the master office 21 reads the default data for initializing the setting information from the initial setting holder 33, and copies the default data for initializing the setting information to an area of the setting holder 32 which is assigned to the slave office 23 (step S46 in FIG. 18).

(Q25) When the copying of the default data is completed, the slave office setting noticing unit 30 of the master office 21 sends a setting initializing notice indicating that the initialization of the setting information is completed to the master office 25 (step S47 in FIG. 18).

In response to the setting initializing notice from the master office 21, the master office 25 copies default data for initializing the setting information from the memory (see FIG. 19).

As described above, because default data for initializing setting information is not transmitted and received between the host system 25, the master office 21, and each slave office in the process of initializing setting information, the amount of transmitted data is reduced, and the efficiency of the data communication path is increased.

A third embodiment of the present invention will be described below.

Figure 20:
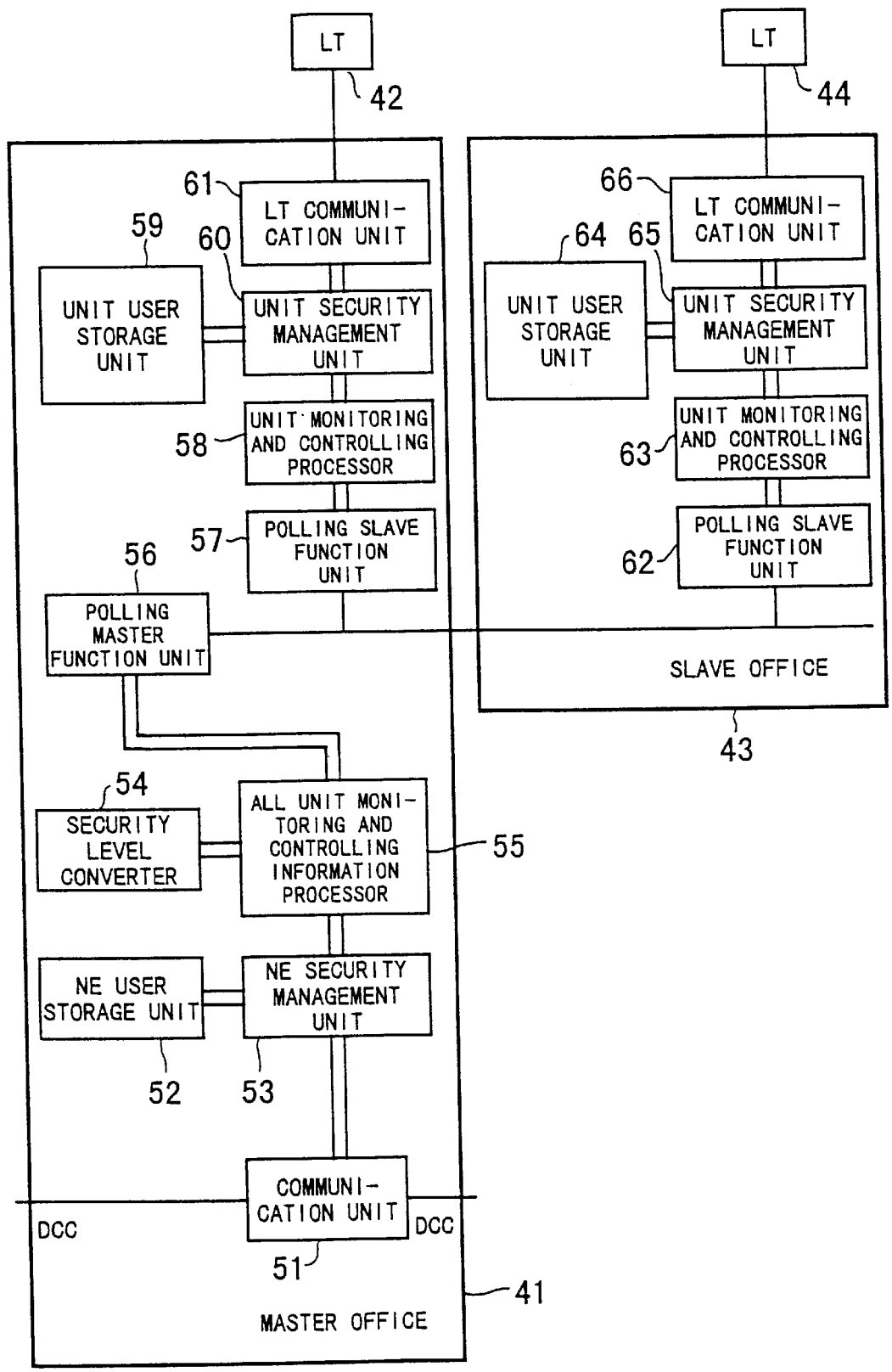
FIG. 20 is a block diagram of a communication network according to a third embodiment of the present invention.
Figure 21:
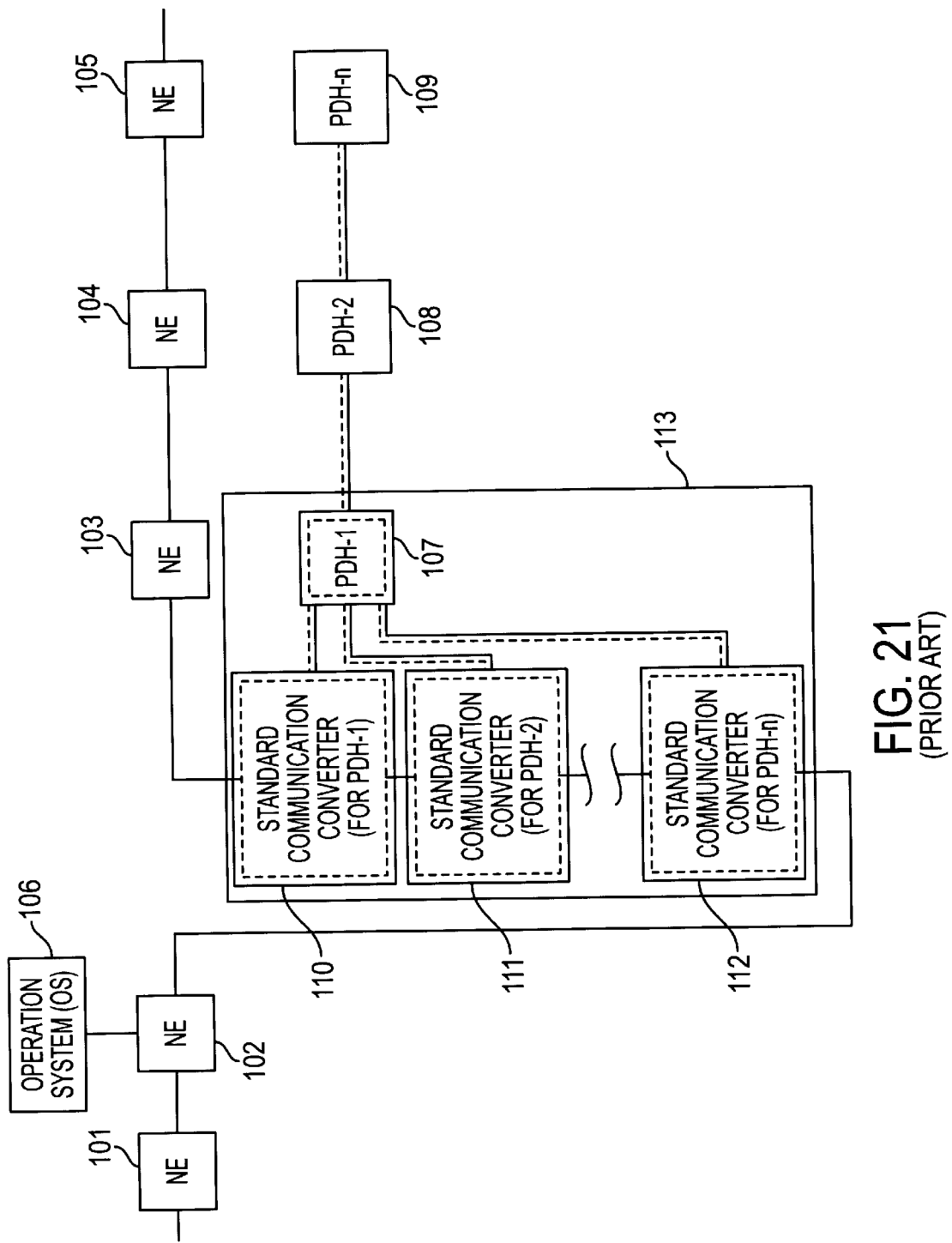
FIG. 21 is a block diagram of a conventional PDH/SDH converting apparatus which is designed to integrate an existing PDH monitoring and controlling system with an SDH communication network monitoring and control system.
Figure 22:
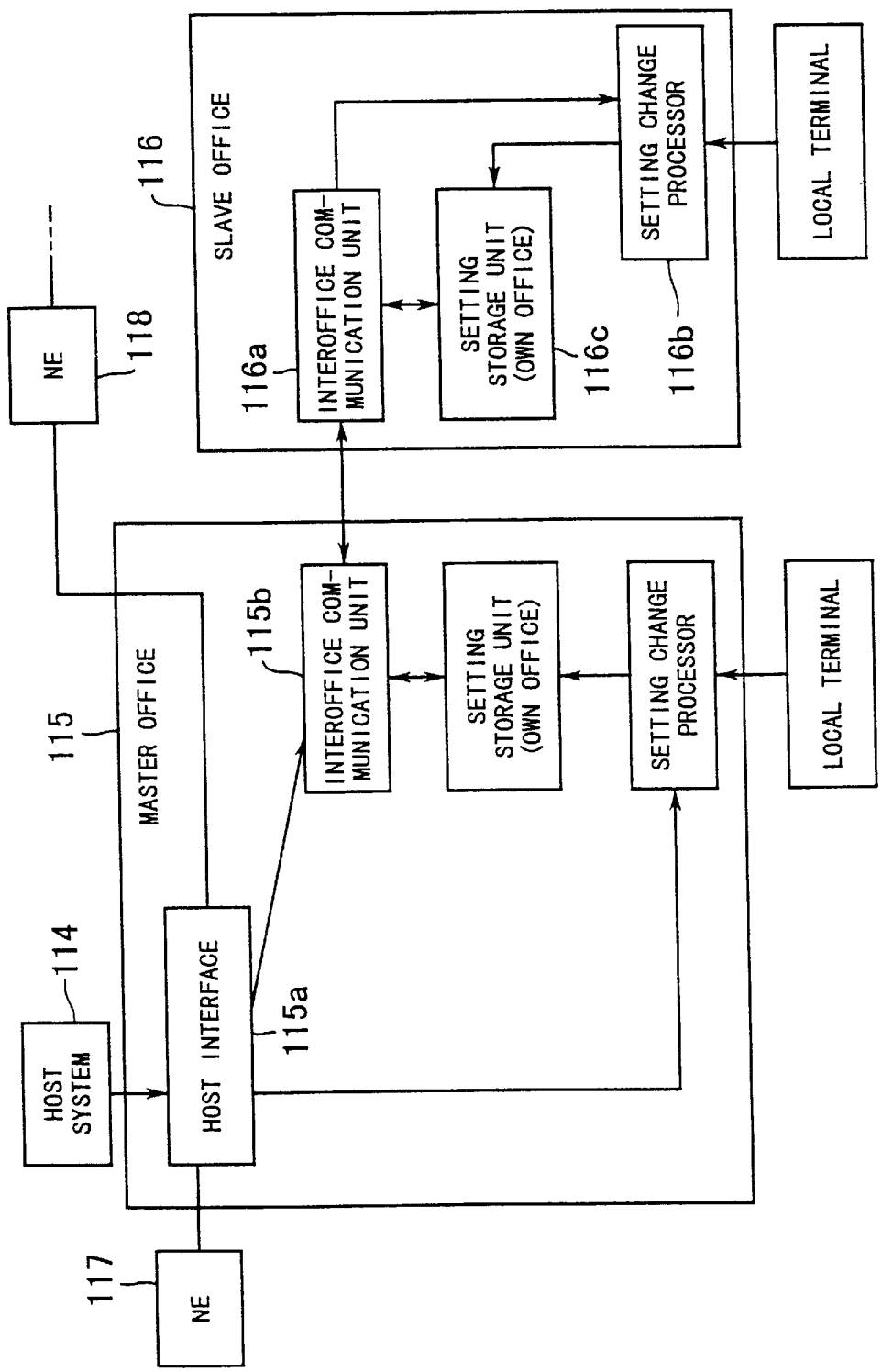
FIG. 22 is a block diagram of the conventional communication system shown in FIG. 21, as viewed from a different viewpoint.

FIG. 20 shows in block form a communication network according to the third embodiment of the present invention. As shown in FIG. 20, a PDH communication network comprises a master office 41, a local terminal (LT, corresponding to the local terminal according to the second embodiment) 42 connected to the master office 41, a slave office 43, and a local terminal (LT) 44 connected to the slave office 43. Each of the master office 41 and the slave office 43 comprises a PDH communication unit. While only one slave office 43 is illustrated in FIG. 20, there are actually a plurality of slave offices in the PDH communication network. The PDH communication network is handled as one network element, and is connected to another network element (not shown in FIG. 20) through the master office 41 via a DCC. A plurality of such network elements make up an SDH communication network. Either one of the network elements is connected to an operation system (not shown in FIG. 20).

The master office 41 includes a master office function section for operating the PDH communication network composed of the PDH communication units as one network element, and a slave office function section operable as one of the PDH communication units. The master office function section comprises a communication unit 51, an NE user storage unit 52, an NE security management unit 53, a security level converter 54, an all unit monitoring and controlling information processor 55, and a polling master function unit 56. The slave office function section comprises a polling slave function unit 57, a unit monitoring and controlling processor 58, a unit user storage unit 59, a unit security management unit 60, and an LT communication unit 61. The slave office 43 corresponds to only the slave office function section of the master office 41, i.e., comprises a polling slave function unit 62, a unit monitoring and controlling processor 63, a unit user storage unit 64, a unit security management unit 65, and an LT communication unit 66.

The NE user storage unit 52 of the master office 41 stores, as default data, identification numbers, passwords, and security levels of operators (users) who are allowed to access the master office 41 and each slave office via the operation system or the local terminals. The identification numbers, the passwords, and the security levels will be collectively referred to as "user information".

The operator enters the identification number and password from the operation system into the communication unit 51 of the master office 41 to apply a log-in request. When the master office 41 receives the log-in request, the NE security management unit 53 compares the entered identification number and password with the user information stored in the NE user storage unit 52, and allows the operator to log in the communication network only when the identification number and password agrees with the user information.

When the operator who has logged in the communication network requests addition, deletion, or modification of the user information, the NE security management unit 53 reads the security level of the operator from the NE user storage unit 52, and decides whether the security level allows the requested addition, deletion, or modification of the user information. Only when the security level allows the requested addition, deletion, or modification of the user information, the operator can add user information to the NE user storage unit 52, delete user information from the NE user storage unit 52, or modify user information in the NE user storage unit 52.

The user information stored in the NE user storage unit 52 is transferred via the polling master function unit 56 and the polling slave function unit 57 to the unit user storage unit 59, which stores the transferred user information. Similarly, the user information stored in the NE user storage unit 52 is transferred via the polling master function unit 56 and the polling slave function unit 62 of the slave office 43 to the unit user storage unit 64 of the slave office 43, which stores the transferred user information.

In this manner, the user information indicative of whether the operator is an operator who is authorized to access the communication network is held by not only the master office 41 which is interfaced with the operation system, but also the slave offices. When the authorized operator requests addition, deletion, or modification of the user information through the operation system, the master office 41 sends the request to all the slave offices including the slave office function section of its own, and enables itself and the slave offices to add, delete, or modify the user information, so that the same user information is held by itself and the slave offices at all times.

If the operator enters its own identification number and password through the local terminal 44, for example, to apply a log-in request to the slave office 43, the unit security management unit 65 of the slave office 43 compares the entered identification number and password with the user information stored in the unit user storage unit 64, and allows the operator to log in the slave office 43 only when the entered identification number and password agree with the user information. Therefore, even when the operator logs in the slave office 43 via the local terminal 44, the slave office 43 can perform the same security function as when the operator logs in the master office 41 via the operation system.

When user information is transferred to a slave office, the security level converter 54 of the master office 41 converts the security level of the user information between the interface with the operation system and the interface with the local terminal, and transfers the user information with the converted security level to the unit user storage units 59, 64.

More specifically, a command structure between the operation system and the master office and a command structure between the local terminal and the slave office may differ from each other. If such command structures differ from each other, the security levels have different significances between the command structures. For example, the operator of the security level 1 may be able to execute an operation of a command 1 only with the command structure between the operation system and the master office, but may be able to execute an operation of a command 3 with the command structure between the local terminal and the slave office. The command structure between the local terminal and the slave office may even be free of any security level provisions.

In order to compensate for such a difference between the command structures, the security level converter 54 of the master office 41 converts the security level of the user information for transferring the user information. If the command structure between the local terminal and the slave office is free of any security level provisions, then the security level converter 54 may be dispensed with.

The user information stored in the unit user storage units 59, 64 is identical to each other. However, the user information stored in the unit user storage units 59, 64 may be different from each other.

Specifically, each slave office may specify an operator who can log in the slave office of its own, and prevent an operator who can log in another slave office from logging in the slave office of its own. This is effective if a plurality of maintenance areas are provided for slave offices, and the maintenance areas are associated with respective maintenance persons who are allowed to care their own maintenance areas only.

Furthermore, if each slave office can hold monitoring and controlling information of other slave offices, then identification information of an operator who is allowed to log in another slave office from a local terminal connected thereto may be stored in the unit user storage unit of an operator's own slave office in association with the other slave office. When the operator's own slave office is requested to provide monitoring and controlling information of the other slave office by the operator via the local terminal connected to the operator's own slave office, the user information stored in the unit user storage unit of the operator's own slave office is referred to, and it is determined whether the user information stored in association with the other slave office to which the requested monitoring and controlling information belongs contains the identification number and password of the operator. If the user information contains the identification number and password of the operator, then the requested monitoring and controlling information is given to the operator.

In this manner, the operator is prevented from unauthorized acquisition of monitoring and controlling information of other slave offices via the local terminal connected to the operator's own slave office.

According to the present invention, as described above, a plurality of PDH units of a PDH communication network are defined together as a single network element, and an SDH communication network and the PDH communication network are monitored in an integrated fashion. The logical processing arrangement of each of the PDH units is simplified, and the PDH units are made relatively inexpensive. Communication equipments for use in the PDH communication network can thus be connected to the SDH communication network and monitored in an integrated manner.

The master office of the PDH communication network collects management information of each slave office at all times. The master office with the collected management information can immediately respond to a request for management information from the operation system, allowing the operation system to respond quickly to the operator.

When a slave office of the PDH communication network changes its setting in response to a request from its external terminal, the slave office indicates the setting change on its own to the master office and the operation system. Therefore, the setting information remains the same at all times in the operation system and the slave offices, and the operation system is not required to check the setting information periodically.

Settings may be made in the slave offices of the PDH communication network from the operation system and settings may be changed from external terminals through the same processing operation. Consequently, the processing operation in the operation system and the slave offices is simplified.

Initializing information is held in the operation system, the master office, and each slave office, and only a setting initializing notice is transmitted and received between the operation system, the master office, and each slave office. The amount of communications which would otherwise be large if the initializing information were transmitted and received is reduced.

The slave offices of the PDH communication network are given the same security function as the master office for allowing the operator to directly log in individual slave offices when the network starts up or in maintenance activities.

Moreover, each of the slave offices has different user information to allow only an operator who is authorized to log in a slave office to log in the slave office.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A communication monitoring and controlling apparatus in an existing network composed of a plurality of communication equipment and connected to a new-type network composed of a plurality of network elements and at least one operation system, comprising:

management information collecting means disposed in a first communication equipment of the existing network which is connected to the new-type network, for collecting management information of the communication equipments of the existing network;

format converting means disposed in said first communication equipment, for converting an existing network management information format of the management information collected by said management information collecting means into a new-type network management information format for accommodating management information of one network element; and transmitting means disposed in said first communication equipment, for transmitting management information outputted from said format converting means to the at least one operation system of the new-type network.

2. A communication monitoring and controlling apparatus according to claim 1, wherein said format converting means comprises means for converting management information transmitted from the at least one operation system into management information in the existing network management information format.

3. A communication monitoring and controlling apparatus in an existing network composed of a plurality of communication equipment and connected to a new-type network composed of a plurality of network elements and at least one operation system, comprising:

notice request transmitting means disposed in a first communication equipment of the existing network which is connected to the new-type network, for transmitting a provide request to notice setting information to a second communication equipment, other than said first communication equipment, of the existing network;

request responding means disposed in said second communication equipment, for transmitting setting information of the second communication equipment to said first communication equipment in response to the notice request transmitted from said notice request transmitting means;

setting information holding means disposed in said first communication equipment, for storing the setting information transmitted from said request responding means; and noticing means disposed in said first communication equipment, for reading the setting information from said setting information holding means and providing the setting information to the at least one operation system in response to a reading request from the at least one operation system.

4. A communication monitoring and controlling apparatus according to claim 3, further comprising:

setting changing means disposed in said second communication equipment, for receiving a change request to change setting information of said second communication equipment from an external terminal, and changing the setting information of said second communication equipment; and changed information transmitting means disposed in said second communication equipment, for transmitting changed setting information to said setting information holding means when the setting information is changed by said setting changing means;

said setting information holding means comprising means for updating the setting information stored therein based on the changed setting information transmitted from said changed information transmitting means.

5. A communication monitoring and controlling apparatus according to claim 4, wherein said setting changing means comprises means for receiving a change request to change setting information of said second communication equipment from the at least one operation system, and changing the setting information of said second communication equipment.

6. A communication monitoring and controlling apparatus according to claim 3, further comprising:

initializing data holding means disposed in said second communication equipment, for holding initializing data for the setting information of said second communication equipment;

setting initializing means disposed in said second communication equipment, for receiving a setting initializing request from the at least one operation system, and initializing the setting information of said second communication equipment with the initializing data held by said initializing data holding means;

initializing completion noticing means disposed in said second communication equipment, for transmitting an initializing completion notice to said first communication equipment when said setting initializing means has completed initialization of the setting information;

all initializing data holding means disposed in said first communication equipment, for holding initializing data for the setting information of all the communication equipment; and reading/noticing means disposed in said first communication equipment and responsive to the initializing completion notice from said initializing completion noticing means, for reading the initializing data from said all initializing data holding means, storing the initializing data in an area, assigned to said second communication equipment, of said setting information holding means, and transmitting an initializing completion notice of said second communication equipment to the at least one operation system.

7. A communication monitoring and controlling apparatus in an existing network composed of a plurality of communication equipment and a plurality of local terminals connected respectively thereto, and connected to a new-type network composed of a plurality of network elements and at least one operation system, comprising:

first user identification information storing means disposed in a first communication equipment of the existing network which is connected to the new-type network, for storing user identification information of a user who is allowed to access the existing network through the at least one operation system;

second user identification information storing means disposed in each of the communication equipments of the existing network, for storing transferred user identification information which is the same as the user identification information stored in said first user identification information storing means; and changing means disposed in said first communication equipment and responsive to a change in the user identification information stored in said first user identification information storing means, for making the same change in the user identification information stored in each of said second user identification information storing means as the change in the user identification information stored in said first user identification information storing means.

8. A communication monitoring and controlling apparatus according to claim 7, wherein said user identification information includes a security level indicative of a command which can be used by the user, and wherein a command structure at a security level stored in said first user identification information storing means and a command structure at a security level stored in said second user identification information storing means differ from each other, said communication monitoring and controlling apparatus further comprising:

security level converting means disposed in said first communication equipment, for converting the security level of user identification information into the security level of the command structure stored in said second user identification information storing means, when the same user identification information as the user identification information stored in said first user identification information storing means is transferred to said second user identification information storing means or when the user identification information stored in said first user identification information storing means is changed;

said changing means being operable after the security level is converted by said security level converting means.

9. A communication monitoring and controlling apparatus according to claim 7, wherein said user identification information stored in said first user identification information storing means includes a security level indicative of a command which can be used by the user, and said user identification information stored in said second user identification information storing means does not include a security level, said communication monitoring and controlling apparatus further comprising:

deleting means disposed in said first communication equipment, for deleting a security level from user identification information and transmitting the user identification information to said changing means, when the same user identification information as the user identification information stored in said first user identification information storing means is transferred to said second user identification information storing means or when the user identification information stored in said first user identification information storing means is changed.

10. A communication monitoring and controlling apparatus according to claim 7, wherein said second user identification information storing means comprises means for storing transferred user identification information which is the same as the user identification information stored in said first user identification information storing means, and storing different user identification information with respect to the communication equipments.

11. A communication monitoring and controlling apparatus in an existing network composed of a plurality of communication equipment and a plurality of local terminals connected respectively thereto, and connected to a new-type network composed of a plurality of network elements and at least one operation system, comprising:

user identification information storing means disposed in each of the communication equipment of the existing network, for storing user identification information of a user who is allowed to access a user's own communication equipment from the local terminal connected thereto, and storing user identification information of a user who is allowed to access another communication equipment from the local terminal connected thereto, in association with the other communication equipment;

monitoring and controlling information holding means disposed in each of the communication equipment of the existing network, for holding monitoring and controlling information of all the communication equipment; and deciding and providing means disposed in each of the communication equipment of the existing network, for referring to the user identification information stored in said user identification information storing means when the user requests said monitoring and controlling information holding means to provide monitoring and controlling information of another communication equipment through the local terminal connected to the user's own communication equipment, deciding whether the user identification information stored in association with the other communication equipment to which the requested monitoring and controlling information belongs contains the user identification information of said user, and reading the requested monitoring and controlling information from said monitoring and controlling information holding means and providing the monitoring and controlling information to said user if the user identification information stored in association with the other communication equipment contains the user identification information of said user.

* * * * *